(12) United States Patent
Miyashita et al.

(10) Patent No.: US 11,146,308 B2
(45) Date of Patent: Oct. 12, 2021

(54) TRANSMITTING DEVICE, RECEIVING DEVICE, TRANSMISSION METHOD, RECEPTION METHOD, AND PROGRAM

(71) Applicant: SONY INTERACTIVE ENTERTAINMENT INC., Tokyo (JP)

(72) Inventors: Takashi Miyashita, Tokyo (JP); Hiroshi Katoh, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/615,435

(22) PCT Filed: Jun. 9, 2017

(86) PCT No.: PCT/JP2017/021464
§ 371 (c)(1),
(2) Date: Nov. 21, 2019

(87) PCT Pub. No.: WO2018/225245
PCT Pub. Date: Dec. 13, 2018

(65) Prior Publication Data
US 2020/0177232 A1 Jun. 4, 2020

(51) Int. Cl.
*H04B 1/713* (2011.01)
(52) U.S. Cl.
CPC .................. *H04B 1/713* (2013.01)
(58) Field of Classification Search
CPC .................................................. H04B 1/7136
See application file for complete search history.

(56) References Cited

U.S. PATENT DOCUMENTS

| 6,996,399 | B2* | 2/2006 | Zinn ..................... H04B 1/7136 375/132 |
| 8,681,653 | B2* | 3/2014 | Shen ..................... H04L 1/0026 370/252 |
| 2003/0178984 | A1* | 9/2003 | Lansford ................ H04B 1/713 324/132 |

(Continued)

FOREIGN PATENT DOCUMENTS

| JP | Hei 7-107010 | 4/1995 |
| JP | 8-125583 A | 5/1996 |

(Continued)

OTHER PUBLICATIONS

International Preliminary Report on Patentability dated Dec. 19, 2019, from International Application No. PCT/JP2017/021464, 13 sheets.

(Continued)

*Primary Examiner* — Qutbuddin Ghulamali
(74) *Attorney, Agent, or Firm* — Katten Muchin Rosenman LLP

(57) ABSTRACT

A transmitting device, a receiving device, a transmission method, a reception method and a program that can improve the data arrival rate in data transmission using a frequency-hopping technique are provided. In each of a plurality of unit periods, an HMD (12) executes data transmission at a frequency associated with the unit period. A packet transmitting unit (84) acquires to-be-transmitted data. The packet transmitting unit (84) transmits identical pieces of the to-be-transmitted data in a plurality of unit periods associated with mutually different frequencies.

6 Claims, 20 Drawing Sheets

(56) References Cited

U.S. PATENT DOCUMENTS

| | | | | |
|---|---|---|---|---|
| 2009/0316761 A1* | 12/2009 | Tiedemann, Jr. | ...... | H04B 1/692 375/147 |
| 2012/0230347 A1* | 9/2012 | Gao | ............... | H04W 72/005 370/432 |
| 2015/0029025 A1* | 1/2015 | Kore | ................. | H04L 63/18 340/539.22 |

FOREIGN PATENT DOCUMENTS

| | | |
|---|---|---|
| JP | 9-214403 A | 8/1997 |
| JP | 2004-147182 A | 5/2004 |

OTHER PUBLICATIONS

International Search Report and Written Opinion dated Aug. 15, 2017, from International Application No. PCT/JP2017/021464, 7 sheets.

\* cited by examiner

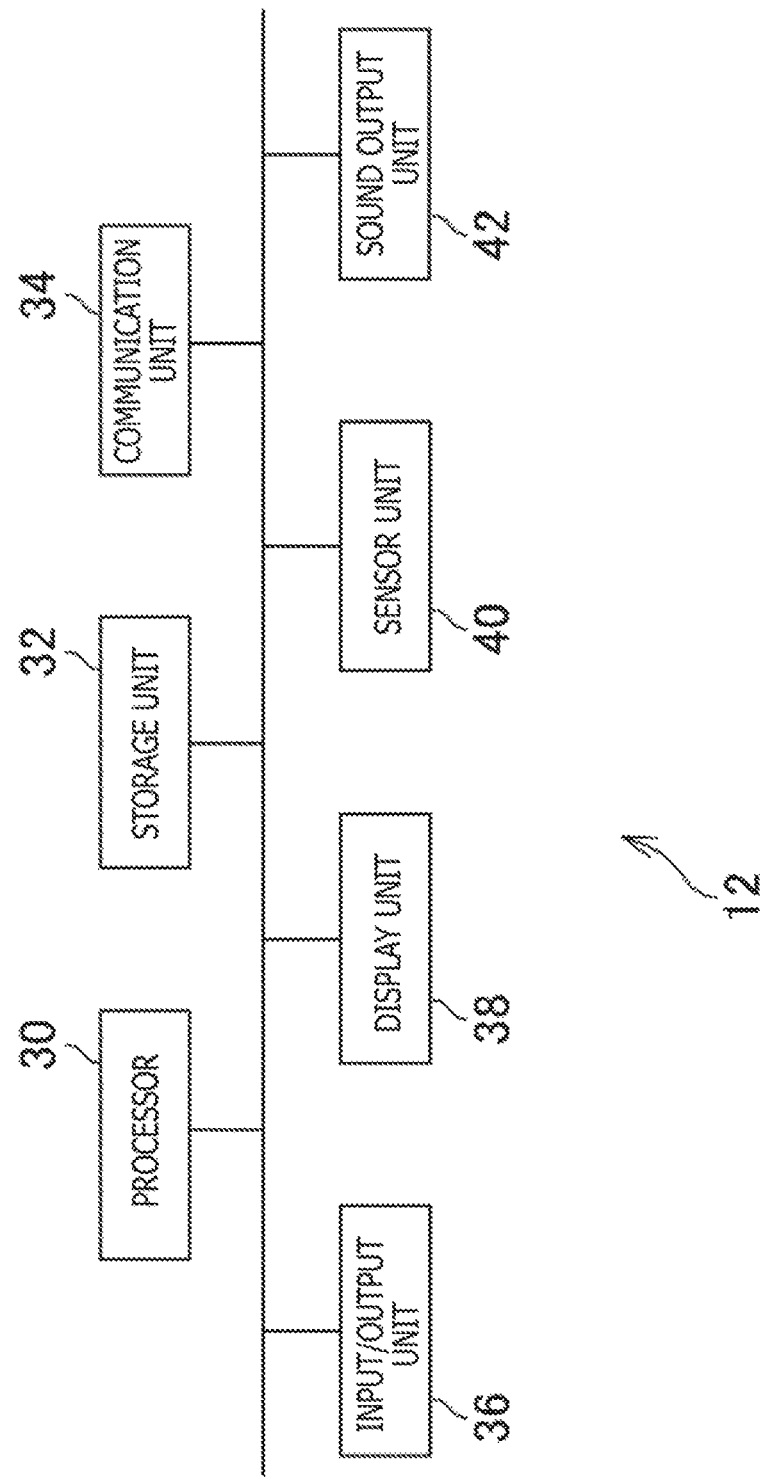

FIG.3

| TIME STAMP DATA | DETECTION RESULT DATA | |
|---|---|---|
| t0 | v0 | } 60(0) |
| t1 | v1 | } 60(1) |
| t2 | v2 | } 60(2) |
| t3 | v3 | } 60(3) |
| t4 | v4 | } 60(4) |
| t5 | v5 | } 60(5) |
| t6 | v6 | } 60(6) |
| t7 | v7 | } 60(7) |
| t8 | v8 | } 60(8) |

FIG.7

| SUBORDER POSITION NUMBER | RECEPTION COMPLETION FLAG |
|---|---|
| 1 | 1 |
| 2 | 1 |
| 3 | 0 |

TRANSMITTING DEVICE, RECEIVING DEVICE, TRANSMISSION METHOD, RECEPTION METHOD, AND PROGRAM

TECHNICAL FIELD

The present invention relates to a transmitting device, a receiving device, a transmission method, a reception method, and a program.

BACKGROUND ART

There are frequency-hopping techniques that realize communication which is highly resistant against noise or interference from other systems by performing communication while the frequency is switched according to a hopping pattern. As one example of such techniques, PTL 1 describes a technique of performing communication while the frequency slot is switched sequentially according to a frequency-hopping pattern.

In the past frequency-hopping techniques, every time the frequency used in communication is changed, data which is different from data transmitted at the frequency before being changed is transmitted at the frequency after being changed. In addition, in data transmission at one frequency, the same data is transmitted multiple times at the frequency in order to make the data arrive at its transmission destination as surely as possible. In this way, even if data transmission at one of multiple times of transmission fails, the data arrives at the transmission destination if it is provided that data transmission at another time of the multiple times of transmission succeeds.

CITATION LIST

Patent Literature

[PTL 1]
Japanese Patent Laid-Open No. Hei 7-107010

SUMMARY

Technical Problem

In recent years, game systems have been considered in which a game device executing a game program transmits, to a head mounted display (HMD) equipped with a sensor such as a motion sensor, motion images that represent the play situation of the game by wireless communication. In addition, it is considered also to transmit data indicating a result of detection by the sensor from the HMD to the game device by wireless communication in such a game system. In this way, it becomes possible to change the play situation of the game depending on a detection result corresponding to changes of the location or direction of the head of a user, for example. Such transmission of data indicating results of detection by a sensor necessitates improvement of the data arrival rate to the highest extent possible.

However, in the past frequency-hopping techniques, the data arrival rate lowers if a situation occurs where all of multiple times of transmission at one frequency fail, the situation including occurrence of noise at the frequency over a period in which data transmission is performed at the frequency.

The present invention has been made in view of the actual circumstances explained above, and one of objects thereof is to provide a transmitting device, a receiving device, a transmission method, a reception method, and a program that can improve the data arrival rate in data transmission using frequency-hopping techniques.

Solution to Problem

In order to solve the problem explained above, a transmitting device according to the present invention is a transmitting device that executes, in each of a plurality of periods, data transmission at a frequency associated with each of the periods, and the transmitting device includes: an acquiring unit that acquires to-be-transmitted data; and a transmitting unit that transmits identical pieces of the to-be-transmitted data in the plurality of periods with which mutually different frequencies are associated.

In one aspect of the present invention, the transmitting unit executes data transmission multiple times in one of the periods, and at one time of data transmission in the one of the periods, the transmitting unit transmits data which is different from data transmitted at another time of data transmission in the period.

In addition, a receiving device according to the present invention is a receiving device that receives, in each of a plurality of periods, data that is transmitted from a transmitting device that executes data transmission at a frequency associated with each of the periods, the data being associated with an order position, and the receiving device includes: a receiving unit that executes data reception multiple times in one of the periods; an output unit that outputs data received by the receiving unit; and a storage unit that, if the receiving unit receives second data which is associated with a latter order position than first data before reception of the first data, stores the second data, in which if the receiving unit receives the first data after reception of the second data, the output unit outputs the second data stored in the storage unit after the received first data is output.

In addition, a transmission method according to the present invention is a transmission method executing, in each of a plurality of periods, data transmission at a frequency associated with each of the periods, and the transmission method includes: an acquisition step of acquiring to-be-transmitted data; and a transmission step of transmitting identical pieces of the to-be-transmitted data in the plurality of periods with which mutually different frequencies are associated.

In addition, a reception method according to the present invention is a reception method receiving, in each of a plurality of periods, data that is transmitted from a transmitting device that executes data transmission at a frequency associated with each of the periods, the data being associated with an order position, and the reception method includes: a reception step of executing data reception multiple times in one of the periods; an output step of outputting data received at the reception step; and a storage step of storing second data in a storage unit if the second data which is associated with a latter order position than first data is received before reception of the first data, in which if the first data is received after reception of the second data at the reception step, the second data stored in the storage unit is output at the output step after the received first data is output.

In addition, a program according to the present invention is a program that makes a computer execute procedures, the computer being configured to execute, in each of a plurality of periods, data transmission at a frequency associated with each of the periods, and the procedures include: an acquisition procedure of acquiring to-be-transmitted data; and a transmission procedure of transmitting identical pieces of the to-be-transmitted data in the plurality of periods with which mutually different frequencies are associated.

In addition, another program according to the present invention is a program that makes a computer execute procedures, the computer being configured to receive, in each of a plurality of periods, data that is transmitted from a transmitting device that executes data transmission at a frequency associated with each of the periods, and the procedures include: a reception procedure of executing data reception multiple times in one of the periods; an output procedure of outputting data received at the reception procedure; and a storage procedure of storing second data in a storage unit if the second data which is associated with a latter order position than first data is received before reception of the first data, in which if the first data is received after reception of the second data at the reception procedure, the second data stored in the storage unit is output at the output procedure after the received first data is output.

BRIEF DESCRIPTION OF DRAWINGS

FIG. 2A is a figure illustrating an exemplary configuration of a head mounted display according to one embodiment of the present invention.

FIG. 3 is a figure illustrating exemplary sensing data.

FIG. 7 is a figure illustrating exemplary reception management data.

DESCRIPTION OF EMBODIMENT

Hereinafter, one embodiment of the present invention is explained with reference to drawings.

Figure 1:
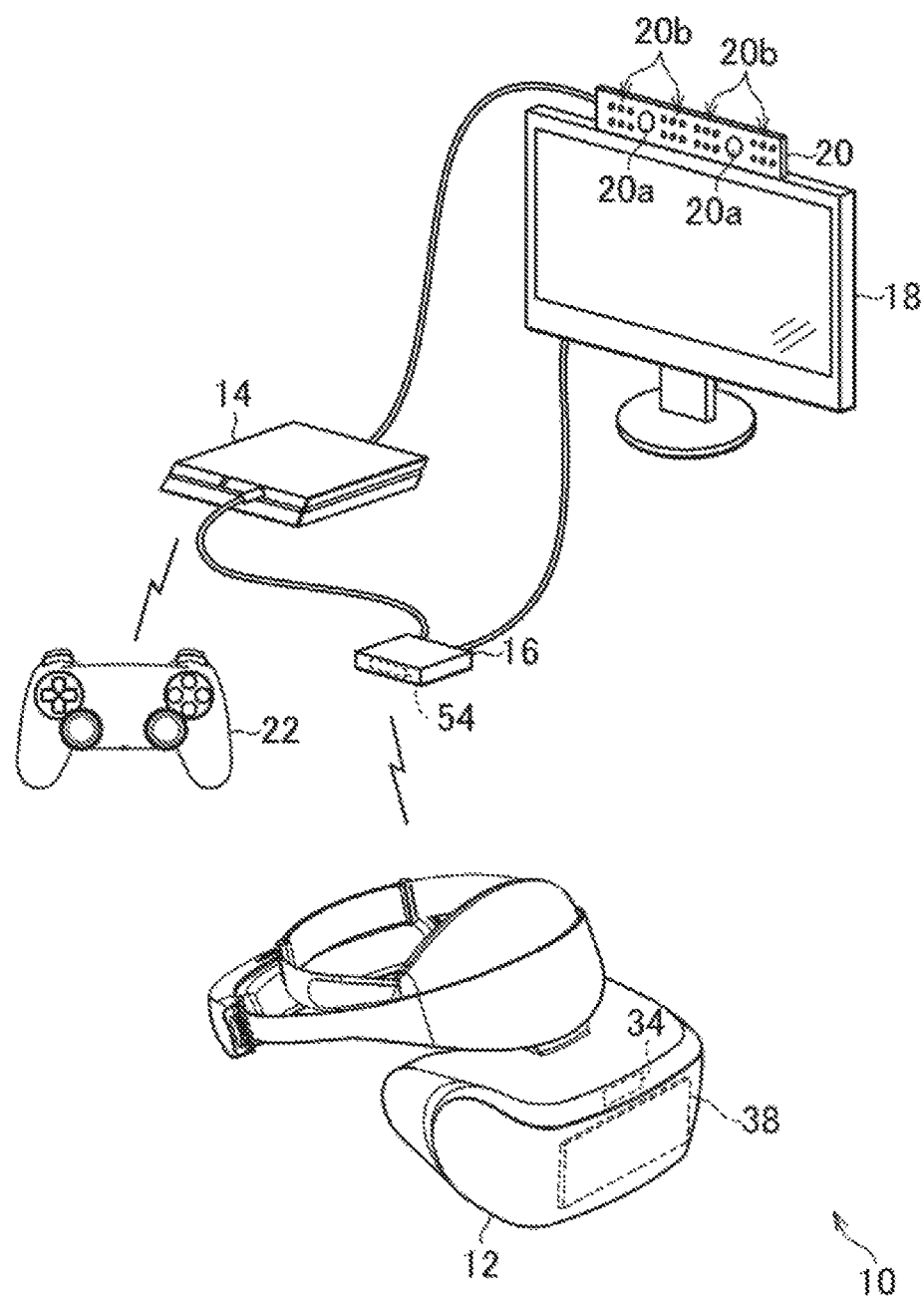
FIG. 1 is a figure illustrating an exemplary overall configuration of an entertainment system according to one embodiment of the present invention.
Figure 2B:
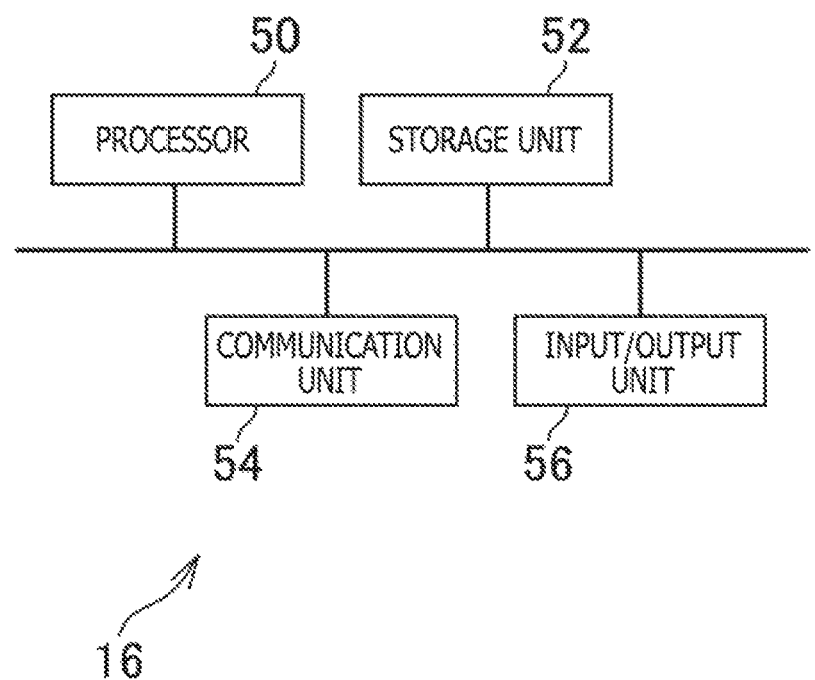
FIG. 2B is a figure illustrating an exemplary configuration of a relay device according to one embodiment of the present invention.

FIG. 1 is a figure illustrating an exemplary overall configuration of an entertainment system 10 according to one embodiment of the present invention. FIG. 2A is a figure illustrating an exemplary configuration of a head mounted display (HMD) 12 according to the present embodiment. FIG. 2B is a figure illustrating an exemplary configuration of a relay device 16 according to the present embodiment.

As illustrated in FIG. 1, the entertainment system 10 according to the present embodiment includes the HMD 12, an entertainment device 14, the relay device 16, a display 18, a camera microphone unit 20, and a controller 22.

As illustrated in FIG. 2A, for example, the HMD 12 according to the present embodiment includes a processor 30, a storage unit 32, a communication unit 34, an input/output unit 36, a display unit 38, a sensor unit 40, and a sound output unit 42.

The processor 30 is a program control device such as a microprocessor that operates according to a program installed on the HMD 12, for example.

The storage unit 32 is a storage element such as a read only memory (ROM) or a random access memory (RAM). The storage unit 32 stores a program to be executed by the processor 30, or the like.

The communication unit 34 is a communication interface such as a wireless local area network (LAN) module. As illustrated in FIG. 1, in the present embodiment, the communication unit 34 is positioned at a front upper portion of the HMD 12.

The input/output unit 36 is an input/output port such as a high-definition multimedia interface (HDMI) (registered trademark) port, a universal serial bus (USB) port, or an auxiliary (AUX) port.

The display unit 38 is a display, such as a liquid crystal display or an organic electroluminescent (EL) display, that is positioned at a front portion of the HMD 12, and displays a video image generated by the entertainment device 14, or the like. In addition, the display unit 38 is housed in a casing of the HMD 12. The display unit 38 may receive video image signals that are output by the entertainment device 14, and relayed by the relay device 16, for example, and may output a video image represented by the video image signals. The display unit 38 according to the present embodiment can display a left-eye image and a right-eye image to be thereby able to display a three-dimensional image, for example. Note that the display unit 38 may be able not to display three-dimensional images, but to display only two-dimensional images.

The sensor unit 40 is a sensor such as a motion sensor that can detect acceleration or angular velocity. The sensor unit 40 outputs, to the processor 30, results of detection about the rotation amount, movement amount and the like of the HMD 12 at a predetermined sampling rate.

The sound output unit 42 is a headphone, a speaker, or the like, and outputs sounds represented by sound data generated by the entertainment device 14, and the like. The sound output unit 42 receives sound signals that are output by the entertainment device 14, and relayed by the relay device 16, for example, and outputs sounds represented by the sound signals.

The entertainment device 14 according to the present embodiment is a computer such as a game console, a digital video disk (DVD) player, or a Blu-ray (registered trademark) player. The entertainment device 14 according to the present embodiment generates video images or sounds for example by execution of stored game programs, reproduction of contents recorded on optical disks, or the like. Then, the entertainment device 14 according to the present embodiment outputs, by way of the relay device 16 to the HMD 12 and the display 18, video image signals representing video images to be generated, and sound signals representing sounds to be generated.

The relay device 16 according to the present embodiment is a computer that relays video image signals and sound signals output from the entertainment device 14 to output them to the HMD 12 and the display 18.

The relay device 16 according to the present embodiment includes a processor 50, a storage unit 52, a communication unit 54, and an input/output unit 56 as illustrated in FIG. 2B, for example.

The processor 50 is a program control device such as a central processing unit (CPU) that operates according to a program installed on the relay device 16.

The storage unit 52 is a storage element such as a ROM or a RAM. The storage unit 52 stores a program to be executed by the processor 50, or the like.

The communication unit 54 is a communication interface such as a wireless LAN module.

The input/output unit 56 is an input/output port such as an HDMI (registered trademark) port, or a USB port.

The display 18 according to the present embodiment is a liquid crystal display, or the like, and displays videos images represented by video image signals output from the entertainment device 14.

The camera microphone unit 20 according to the present embodiment includes cameras 20a that output, to the entertainment device 14, images obtained by image-capturing of objects, for example, and microphones 20b that acquire ambient sounds, convert the sounds into sound data, and output the sound data to the entertainment device 14. In addition, the cameras 20a according to the present embodiment are stereo cameras.

The HMD 12 and the relay device 16 can transmit and receive data to and from each other through wireless communication, for example. The entertainment device 14 and the relay device 16 are connected to each other through an HDMI cable, a USB cable, or the like. The relay device 16 and the display 18 are connected to each other through an HDMI cable or the like. The entertainment device 14 and the camera microphone unit 20 are connected to each other through an AUX cable or the like.

The controller 22 according to the present embodiment is a manipulation input device for performing manipulation input to the entertainment device 14. A user presses direction keys or buttons provided to the controller 22, or tilts manipulation sticks provided to the controller 22 to be thereby able to perform various types of manipulation input by using the controller 22. Then, in the present embodiment, the controller 22 outputs input data associated with manipulation input to the entertainment device 14. In addition, the controller 22 according to the present embodiment includes a USB port. Then, the controller 22 is connected with the entertainment device 14 through a USB cable to be thereby able to output input data to the entertainment device 14 through a cabled communication. In addition, the controller 22 according to the present embodiment includes a wireless communication module or the like, and also can output input data to the entertainment device 14 wirelessly.

In the present embodiment, for example, while a game program is being executed in the entertainment device 14, the sensor unit 40 of the HMD 12 generates, at a predetermined sampling rate, data that indicates the location or direction of the HMD 12, or change amounts of the location or direction which are detection results. FIG. 3 is a figure illustrating sensing data 60 which is exemplary data generated at the sensor unit 40 in this manner. FIG. 3 illustrates nine pieces of sensing data 60 (60(0) to 60(8)). As illustrated in FIG. 3, sensing data 60 includes time stamp data that indicates time stamps of times at which detection results are detected, and detection result data that indicates locations or directions of the HMD 12, or values of change amounts of the location or direction which are the detection results. In this manner, in the sensing data 60 according to the present embodiment, detection results are associated with times at which the detections results are detected.

In the time stamp data illustrated in the example of FIG. 3, t0 indicates the oldest time stamp, and t1, t2, t3, . . . , and t7 indicate the second, third, fourth, . . . , and eighth oldest time stamps. Then, t8 indicates the newest time stamp.

Figure 4A:
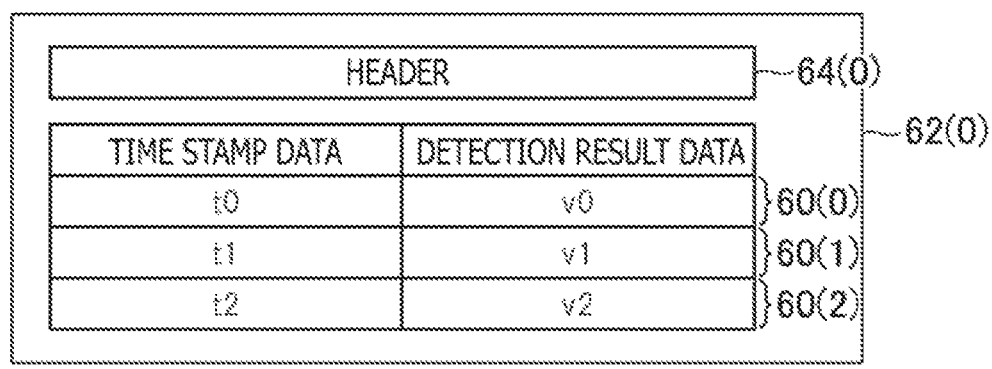
FIG. 4A is a figure illustrating exemplary to-be-transmitted data.
Figure 4B:
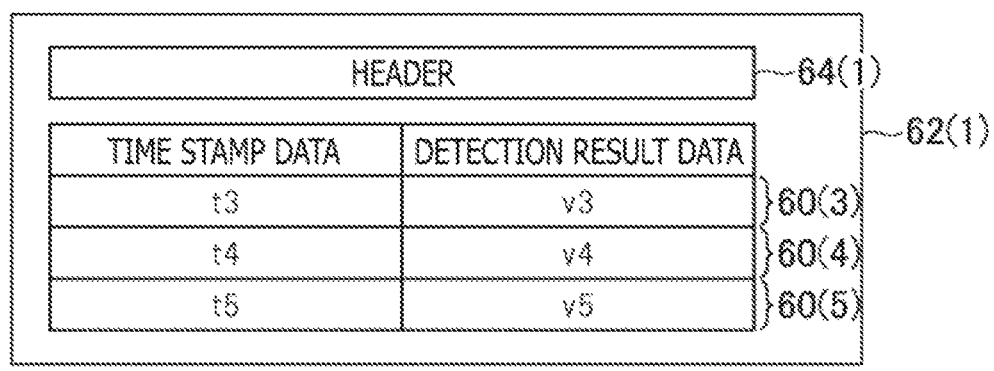
FIG. 4B is a figure illustrating exemplary to-be-transmitted data.

Then, in the present embodiment, to-be-transmitted data 62 illustrated in FIG. 4A and FIG. 4B is generated based on sensing data generated at the sensor unit 40. As illustrated in FIG. 4A and FIG. 4B, to-be-transmitted data 62 includes a header 64 and one or more pieces of sensing data 60.

Here, for example, at the time of generation of new to-be-transmitted data 62, one or more pieces of sensing data 60 may be selected from pieces of sensing data 60 that have not been used as sensing data 60 included in to-be-transmitted data 62. Then, to-be-transmitted data 62 including the one or more selected pieces of sensing data 60 may be generated. In this case, one or more pieces of sensing data 60 may be selected in the order of associated time stamps from the oldest ones.

Here, to-be-transmitted data 62(1) illustrated in FIG. 4B is generated after generation of to-be-transmitted data 62(0) illustrated in FIG. 4A. Then, as sensing data 60 to be included in the to-be-transmitted data 62(0), three pieces of sensing data with which the oldest time stamps are associated are selected from the sensing data 60(0) to 60(8). In this case, 60(0) to 60(2) are selected from the sensing data 60(0) to 60(8), and 60(0) to 60(2) are included in the to-be-transmitted data 62(0). In this manner, the to-be-transmitted data 62(0) including the sensing data 60(0) to 60(2), and a header 64(0) is generated.

In the example of FIG. 4B, sensing data 60 to be included in the to-be-transmitted data 62(1) is selected from the sensing data 60(3) to 60(8) having not been used as sensing data 60 included in the to-be-transmitted data 62(0). In this case also, for example, three pieces of sensing data 60 with which the oldest time stamps are associated are selected. In this case, 60(3) to 60(5) are selected from the sensing data 60(3) to 60(8), and 60(3) to 60(5) are included in the to-be-transmitted data 62(1). In this manner, the to-be-transmitted data 62(1) including the sensing data 60(3) to 60(5), and a header 64(1) is generated.

Hereinafter, in the present embodiment, to-be-transmitted data 62(2) to 62(6) is generated similarly (see FIG. 5). In this manner, in the present embodiment, to-be-transmitted data 62 is ordered in the order of time stamps indicated by included time stamp data, from the oldest ones to the newest ones. Hereinafter, for example, values n indicated in to-be-transmitted data 62(*n*) are called order position numbers (n=0, 1, . . . , 6). In the present embodiment, for example, the earlier the order position of to-be-transmitted data 62(*n*) is, the smaller the set order position number is, and the latter the order position of to-be-transmitted data 62(*n*) is, the larger the set order position number is. Here, for example, a header 64(*n*) included in to-be-transmitted data 62(*n*) may include a value n, which is the order position number.

Note that although in the example explained above, the number of pieces of sensing data 60 included in to-be-transmitted data 62 is three, the number of pieces of sensing data 60 included in to-be-transmitted data 62 needs not to be three.

Then, the thus-generated to-be-transmitted data 62 is transmitted to the relay device 16 which is the transmission destination of the HMD 12.

The relay device 16 having received the to-be-transmitted data 62 outputs the to-be-transmitted data 62 received from the HMD 12 to the entertainment device 14. Then, based on the to-be-transmitted data 62 received from the relay device 16, the entertainment device 14 executes various types of process in a game program being executed. For example, in a situation where a video image representing how it appears when seen in a line-of-sight direction from a point of view positioned in a virtual space is displayed on the display unit 38 of the HMD 12, the entertainment device 14 changes the location of the point of view or the line-of-sight direction depending on received data. In this manner, a video image displayed on the display unit 38 of the HMD 12 is changed depending on the location or direction of the HMD 12.

In the present embodiment, a plurality of channels each associated with a frequency used in communication are set in advance. Then, some of the plurality of channels are included in a hopping pattern. Then, according to a hopping pattern set in the HMD 12 and the relay device 16, the HMD 12 transmits to-be-transmitted data 62 to the relay device 16 while switching the channel for each unit period (e.g., 1 millisecond).

Figure 5:
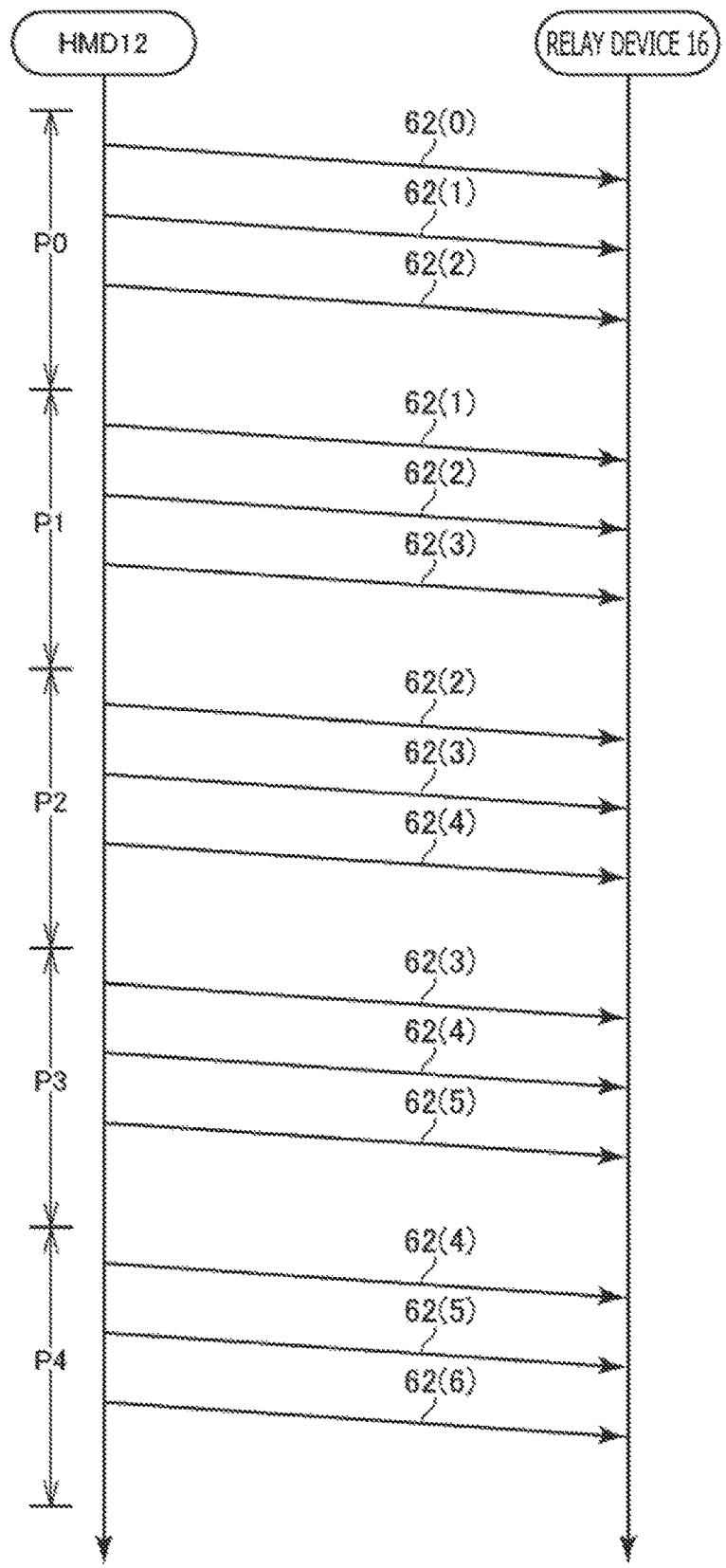
FIG. 5 is a figure illustrating exemplary transmission and reception of to-be-transmitted data.

FIG. 5 illustrates exemplary transmission and reception of to-be-transmitted data 62 in unit periods P0 to P4. As illustrated in FIG. 5, in the present embodiment, for example, mutually different pieces of to-be-transmitted data 62 are transmitted consecutively multiple times (e.g., three times) at one channel in one unit period. Hereinafter, an order position in multiple times of transmission performed at one channel is called a suborder position. In addition, transmission performed for the n-th time in multiple times of transmission at one channel is called n-th transmission. For example, if transmission is performed three times consecutively at one channel, the instances of transmission are called first transmission, second transmission and third transmission, respectively. In this case, the suborder positions of the first transmission, the second transmission, and the third transmission are 1, 2 and 3, respectively.

Here, for example, the first transmission may be executed at a time at which first time has elapsed after the switch of the frequency (after a unit period started). In addition, for example, the second transmission may be executed at a time at which second time longer than the first time mentioned above has elapsed after the switch of the frequency (after the unit period started). In addition, for example, the third transmission may be executed at a time at which third time longer than the second time mentioned above has elapsed after the switch of the frequency (after the unit period started). Here, it may be possible to detect the times of the first transmission, the second transmission, and the third transmission by using a timer provided to the HMD 12, for example.

In addition, as illustrated in FIG. 5, in the present embodiment, identical pieces of to-be-transmitted data 62 are transmitted in a plurality of unit periods which are associated with mutually different channels. In the example of FIG. 5, the to-be-transmitted data 62(2) is transmitted in the unit periods P0, P1, and P2. In addition, the to-be-transmitted data 62(3) is transmitted in the unit periods P1, P2, and P3. In addition, the to-be-transmitted data 62(4) is transmitted in the unit periods P2, P3, and P4.

Note that although not illustrated in FIG. 5, the to-be-transmitted data 62(0) is transmitted not only in the unit period P0, but also in the unit period immediately before the unit period P0, and the unit period immediately before that unit period. In addition, the to-be-transmitted data 62(1) is transmitted not only in the unit periods P0 and P1, but also in the unit period immediately before the unit period P0. In addition, the to-be-transmitted data 62(5) is transmitted not only in the unit periods P3 and P4, but also in the unit period immediately after the unit period P4. In addition, the to-be-transmitted data 62(6) is transmitted not only in the unit period P4, but also in the unit period immediately after the unit period P4, and the unit period immediately after that unit period.

In addition, in the present embodiment, for example, the order of time stamps associated with sensing data 60 included in to-be-transmitted data 62 is associated with the order positions of initial transmission of the to-be-transmitted data 62. In the example of FIG. 5, the initial transmission of the to-be-transmitted data 62(3) is performed earlier than the initial transmission of the to-be-transmitted data 62(4). For example, the initial transmission of the to-be-transmitted data 62(3) is performed in the unit period P1, and the initial transmission of the to-be-transmitted data 62(4) is performed in the unit period P2, which is later than the unit period P1.

In addition, in the present embodiment, one piece of to-be-transmitted data 62 is transmitted consecutively over three unit periods. Here, for example, one piece of to-be-transmitted data 62 may be transmitted at the third transmission in the initial unit period, transmitted at the second transmission in the second unit period, and transmitted at the first transmission in the last unit period. In FIG. 5, for example, the to-be-transmitted data 62(3) is illustrated as being transmitted at the third transmission in the unit period P1, transmitted at the second transmission in the unit period P2, and transmitted at the first transmission in the unit period P3.

As explained above, in the present embodiment, identical pieces of to-be-transmitted data 62 are transmitted from the HMD 12 to the relay device 16 in a plurality of unit periods that are associated with mutually different frequencies (channels).

For example, noise may occur at a frequency over a unit period in which transmission of to-be-transmitted data 62 is performed at one channel (frequency). Even in such a case, according to the present embodiment, as mentioned above, transmission of to-be-transmitted data 62 is executed not only at the one channel (frequency) but also at another channel (frequency). Because of this, according to the present embodiment, the rate of arrival of the to-be-transmitted data 62 at the relay device 16 improves.

Hereinafter, functions of the HMD 12 and relay device 16 according to the present embodiment, and processes to be executed at the HMD 12 and relay device 16 according to the present embodiment are explained further.

Figure 6A:
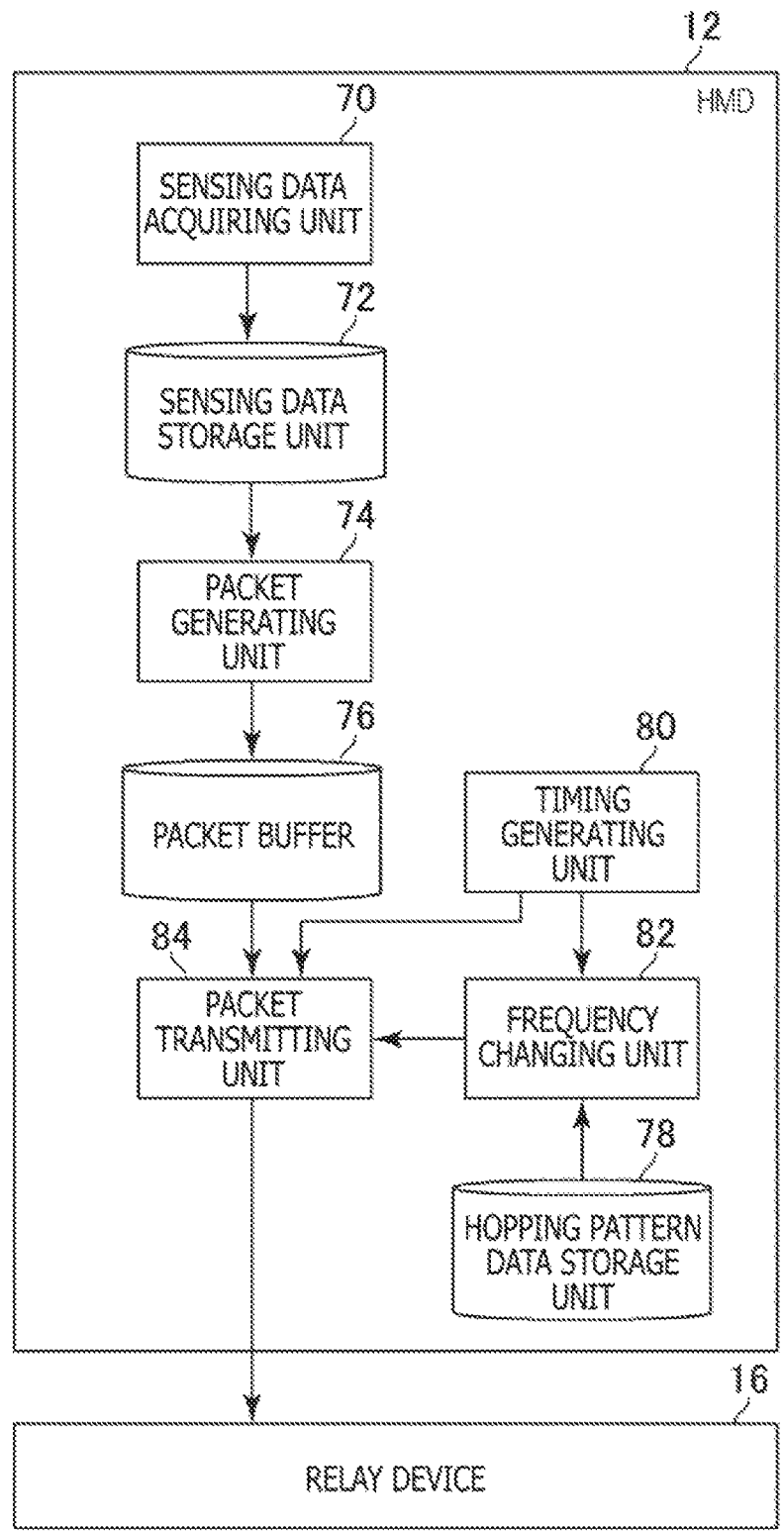
FIG. 6A is a functional block diagram illustrating exemplary functions implemented at the head mounted display according to one embodiment of the present invention.

FIG. 6A is a functional block diagram illustrating exemplary functions implemented at the HMD 12 according to the present embodiment. Note that not all the functions illustrated in FIG. 6A need to be implemented at the HMD 12 according to the present embodiment, and also functions other than the functions illustrated in FIG. 6A are allowed to be implemented.

As illustrated in FIG. 6A, the HMD 12 according to the present embodiment functionally includes, for example, a sensing data acquiring unit 70, a sensing data storage unit 72, a packet generating unit 74, a packet buffer 76, a hopping pattern data storage unit 78, a timing generating unit 80, a frequency changing unit 82, and a packet transmitting unit 84. The sensing data acquiring unit 70 is implemented mainly by the processor 30 and the sensor unit 40. The sensing data storage unit 72, the packet buffer 76, and the hopping pattern data storage unit 78 are implemented mainly by the storage unit 32. The packet generating unit 74, the timing generating unit 80, and the frequency changing unit 82 are implemented mainly by the processor 30. The packet transmitting unit 84 is implemented mainly by the communication unit 34.

The functions explained above may be implemented by the processor 30 executing a program installed on the HMD 12 which is a computer, and including commands corresponding to the functions explained above. This program may be supplied to the HMD 12 through a computer-readable information storage medium such as an optical disk, a magnetic disk, a magnetic tape, a magneto-optical disk, or a flash memory or through the internet or the like.

Figure 6B:
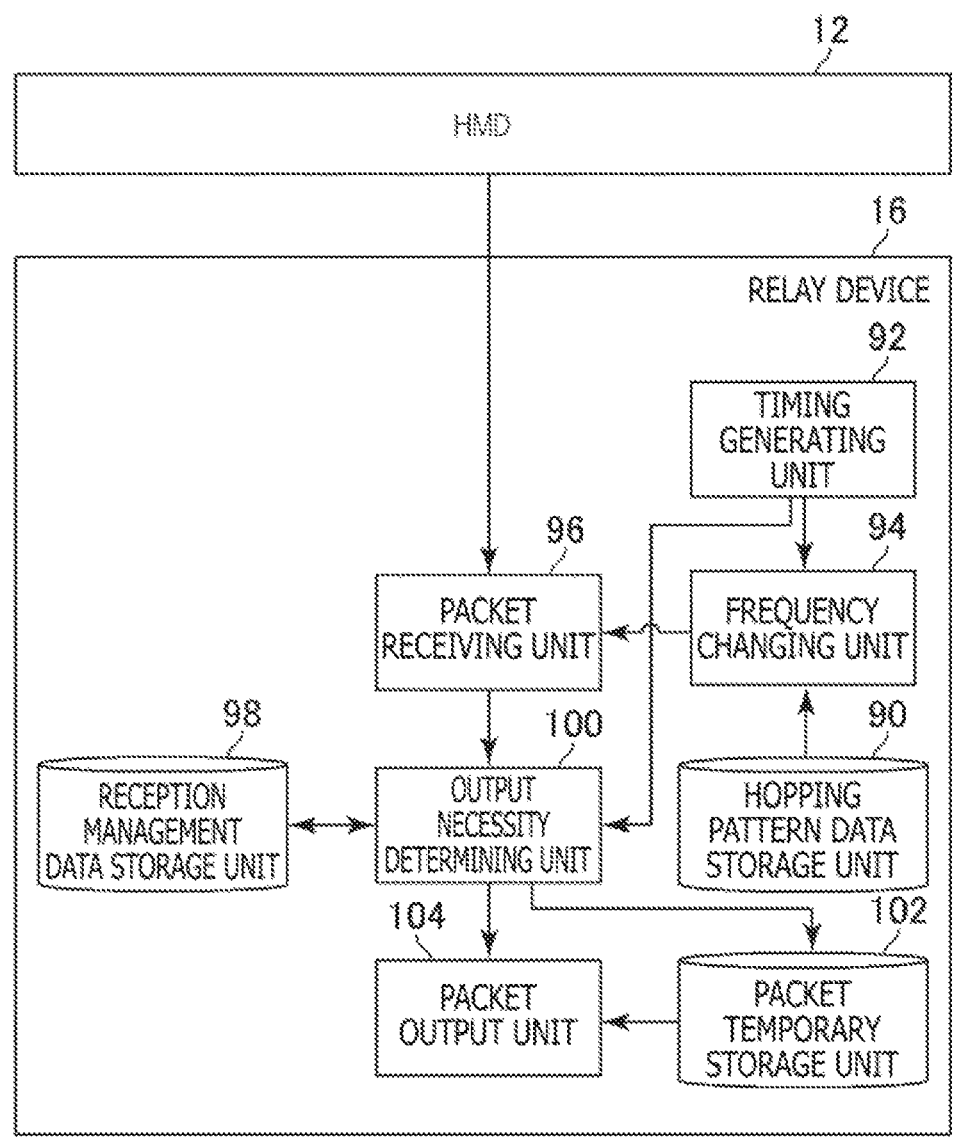
FIG. 6B is a functional block diagram illustrating exemplary functions implemented at the relay device according to one embodiment of the present invention.

FIG. 6B is a functional block diagram illustrating exemplary functions implemented at the relay device 16 according to the present embodiment. Note that not all the functions illustrated in FIG. 6B need to be implemented at the relay device 16 according to the present embodiment, and also functions other than the functions illustrated in FIG. 6B are allowed to be implemented.

As illustrated in FIG. 6B, the relay device 16 according to the present embodiment functionally includes, for example, a hopping pattern data storage unit 90, a timing generating unit 92, a frequency changing unit 94, a packet receiving unit 96, a reception management data storage unit 98, an output necessity determining unit 100, a packet temporary storage unit 102, and a packet output unit 104. The hopping pattern data storage unit 90, the reception management data storage unit 98, and the packet temporary storage unit 102 are implemented mainly by the storage unit 52. The timing generating unit 92, the frequency changing unit 94, and the output necessity determining unit 100 are implemented mainly by the processor 50. The packet receiving unit 96 is implemented mainly by the communication unit 54. The packet output unit 104 is implemented mainly by the processor 50 and the input/output unit 56.

The functions explained above may be implemented by the processor 50 executing a program installed on the relay device 16 which is a computer, and including commands corresponding to the functions explained above. This program may be supplied to the relay device 16 through a computer-readable information storage medium such as an optical disk, a magnetic disk, a magnetic tape, a magneto-optical disk, or a flash memory or through the internet or the like.

In the present embodiment, for example, the sensing data acquiring unit 70 acquires sensing data 60 which is data about a detection result generated by the sensor unit 40 at a predetermined sampling rate, and representing the location or direction of the HMD 12, or change amounts of the location or direction. In addition, the sensing data acquiring unit 70 makes the acquired sensing data 60 stored in the sensing data storage unit 72.

In the present embodiment, for example, the sensing data storage unit 72 stores the sensing data 60 acquired by the sensing data acquiring unit 70.

In the present embodiment, for example, the packet generating unit 74 generates packets of to-be-transmitted data 62 based on sensing data 60 stored in the sensing data storage unit 72. Here, for example, the number of pieces of sensing data 60 included in a packet of to-be-transmitted data 62 may be determined based on a predetermined packet size and the sizes of the pieces of sensing data 60

In addition, the packet generating unit 74 may generate to-be-transmitted data 62 including the order position of to-be-transmitted data 62 (e.g., order position number mentioned above) that is included in a header 64.

In addition, as mentioned above, the packet generating unit 74 may select pieces of sensing data 60 in the order of corresponding time stamps from the oldest ones among pieces of sensing data 60 that are stored in the sensing data storage unit 72. Then, the packet generating unit 74 may generate to-be-transmitted data 62 including the selected pieces of sensing data 60. In addition, the packet generating unit 74 may delete the pieces of sensing data 60 that are included in the generated to-be-transmitted data 62 from the sensing data storage unit 72.

In addition, in the present embodiment, for example, the packet generating unit 74 makes the generated to-be-transmitted data 62 stored in the packet buffer 76.

In the present embodiment, for example, the packet buffer 76 stores packets of the to-be-transmitted data 62 generated by the packet generating unit 74. Here, the packet buffer 76 may store the to-be-transmitted data 62 with the order position of the to-be-transmitted data 62 (e.g., the order position number mentioned above) being associated therewith.

In the present embodiment, for example, the hopping pattern data storage unit 78 and the hopping pattern data storage unit 90 store hopping pattern data indicating a frequency-hopping pattern to be used in transmission of to-be-transmitted data 62. In the present embodiment, for example, identical hopping pattern data is stored in both the hopping pattern data storage unit 78 and the hopping pattern data storage unit 90.

In the present embodiment, for example, the timing generating unit 80 generates a timing signal, and outputs the timing signal to the frequency changing unit 82 or the packet transmitting unit 84. Here, for example, at the time at which the frequency is changed (the time when a unit period starts), the timing generating unit 80 may output, to the frequency changing unit 82, a timing signal indicating that it is the time to change the frequency. In addition, for example, at a time at which first time has elapsed after the change of the frequency, the timing generating unit 80 may output, to the packet transmitting unit 84, a timing signal indicating that the first time has elapsed. Similarly, at a time at which second time has elapsed after the change of the frequency, the timing generating unit 92 may output, to the packet transmitting unit 84, a timing signal indicating that the second time has elapsed. In addition, at a time at which third time has elapsed after the change of the frequency, the timing generating unit 92 may output, to the packet transmitting unit 84, a timing signal indicating that the third time has elapsed.

In the present embodiment, for example, the frequency changing unit 82 changes the frequency used in transmission of to-be-transmitted data 62 by the communication unit 34 according to the hopping pattern indicated by the hopping pattern data stored in the hopping pattern data storage unit 78. The frequency changing unit 82 may instruct the communication unit 34 to change the channel used in communication according to a time indicated by a timing signal received from the timing generating unit 80.

In the present embodiment, for example, at the frequency which is changed by the frequency changing unit 82 at every unit period, the packet transmitting unit 84 transmits, to the relay device 16, packets of to-be-transmitted data 62 generated by the packet generating unit 74. Here, the packet transmitting unit 84 may acquire to-be-transmitted data 62 stored in the packet buffer 76, and transmit the acquired to-be-transmitted data 62 to the relay device 16. In addition, for example, each copy of to-be-transmitted data 62 stored in the packet buffer 76 may be transmitted in each of a plurality of unit periods. In addition, for example based on an instruction to change the frequency received from the frequency changing unit 82, the packet transmitting unit 84 may switch the frequency used in data communication. Here, the channel used in data communication may be changed based on an instruction to change the channel received from the frequency changing unit 82.

In addition, as illustrated in FIG. 5, the packet transmitting unit 84 may transmit identical pieces of to-be-transmitted data 62 in a plurality of unit periods associated with mutually different frequencies. In addition, as illustrated in FIG. 5, data transmitted by the packet transmitting unit 84 at one time of data transmission in one unit period may be different from data transmitted by the packet transmitting unit 84 at another time of data transmission in the unit period.

Here, for example, the packet transmitting unit 84 may select a predetermined number (e.g., three) of pieces of to-be-transmitted data 62 in ascending order of order positions among pieces of to-be-transmitted data 62 that are stored in the packet buffer 76 and have not been transmitted a predetermined number of times (e.g., three times transmission). Here, for example, selection of a predetermined number of pieces of to-be-transmitted data 62 can be performed based on order position numbers that are included in headers 64, or order positions associated with to-be-transmitted data 62. Then, the packet transmitting unit 84 may transmit packets of a predetermined number of selected pieces of to-be-transmitted data 62 to the relay device 16. Here, in the present embodiment, for example, packets of different pieces of to-be-transmitted data 62 are transmitted to the relay device 16 at different times among a predetermined number of times of transmission at one frequency.

Here, for example, as illustrated in FIG. 5, at a predetermined number of times of transmission at one frequency, a predetermined number of selected pieces of to-be-transmitted data 62 may be transmitted in ascending order of order position numbers. In addition, conversely, they may be transmitted in descending order of order position numbers. In addition, at a predetermined number of times of transmission at one frequency, a predetermined number of selected pieces of to-be-transmitted data 62 may be transmitted in an order different from these orders.

For example, the number of times of transmission at one frequency is three. In this case, from among three selected pieces of to-be-transmitted data 62, the one at the earliest position, the one at the second earliest position, and the one at the last position may be transmitted in this order. In addition, conversely, from among three selected pieces of to-be-transmitted data 62, the one at the last position, the one at the second last position, and the one at the earliest position may be transmitted in this order.

In the present embodiment, for example, the timing generating unit 92 generates a timing signal, and outputs the timing signal to the frequency changing unit 94 or the output necessity determining unit 100. Here, for example, at the time to change the frequency (the time when a unit period starts), the timing generating unit 92 may output, to the frequency changing unit 94, a timing signal indicating that it is the time to change the frequency. In addition, for example, at a time at which first time has elapsed after the change of the frequency, the timing generating unit 92 may output, to the output necessity determining unit 100, a timing signal indicating that the first time has elapsed. Similarly, at a time at which second time has elapsed after the change of the frequency, the timing generating unit 92 may output, to the output necessity determining unit 100, a timing signal indicating that the second time has elapsed. In addition, at a time at which third time has elapsed after the change of the frequency, the timing generating unit 92 may output, to the output necessity determining unit 100, a timing signal indicating that the third time has elapsed.

In the present embodiment, for example, the frequency changing unit 94 changes the frequency used in reception of to-be-transmitted data 62 by the communication unit 54 according to a hopping pattern indicated by hopping pattern data stored in the hopping pattern data storage unit 90. The frequency changing unit 94 may instruct the communication unit 54 to change the channel used in communication according to a time indicated by a timing signal received from the timing generating unit 92.

In the present embodiment, for example, at the frequency which is changed by the frequency changing unit 94 at every unit period, the packet receiving unit 96 receives packets of to-be-transmitted data 62 transmitted by the packet transmitting unit 84. In addition, for example based on an instruction to change the channel received from the frequency changing unit 94, the packet receiving unit 96 may change the channel used in data communication.

In addition, as illustrated in FIG. 5, the packet receiving unit 96 may execute data reception multiple times in one unit period.

In the present embodiment, for example, the reception management data storage unit 98 stores reception management data illustrated in FIG. 7. As illustrated in FIG. 7, reception management data includes suborder position numbers and reception completion flags.

In the present embodiment, for example, suborder position numbers are numbers associated with the suborder positions mentioned above. For example, if transmission of to-be-transmitted data 62 is executed three times in one unit period, the first transmission, the second transmission, and the third transmission are associated with reception management data with suborder position numbers 1, 2, and 3, respectively. Hereinafter, the reception management data with suborder position numbers 1, 2, and 3 is called reception management data (1), reception management data (2), and reception management data (3), respectively.

Then, a reception completion flag is a flag indicating whether or not to-be-transmitted data 62 is normally received. In the present embodiment, for example, 1 is set as a reception completion flag value of reception management data associated with normally received to-be-transmitted data 62, and 0 is set as a reception completion flag value of reception management data associated with to-be-transmitted data 62 which has not been received.

In the present embodiment, for example, the output necessity determining unit 100 determines whether to or not to output received to-be-transmitted data 62 based on whether or not the packet receiving unit 96 has received packets, and based on reception management data stored in the reception management data storage unit 98.

In addition, the output necessity determining unit 100 may determine whether to or not to make received to-be-transmitted data 62 stored in the packet temporary storage unit 102 temporarily. For example, it is possible that after reception of the to-be-transmitted data 62(4), the to-be-transmitted data 62(3) which is at an earlier order position than the to-be-transmitted data 62(4) is received. For example, if there is a possibility of such a case, the output necessity determining unit 100 may make the received to-be-transmitted data 62(4) stored in the packet temporary storage unit 102.

In addition, in the present embodiment, the output necessity determining unit 100 can identify suborder positions of to-be-transmitted data 62 received by the packet receiving unit 96. Here, it does not matter particularly what the method of identifying the suborder positions of received to-be-transmitted data 62 is. For example, a header 64 of to-be-transmitted data 62 may indicate its suborder position, and the suborder position of the to-be-transmitted data 62 may be identified by referring to the suborder position. In addition, for example, the suborder position of the to-be-transmitted data 62 may be identified based on a length of time that elapses from the time when the frequency is changed to the time when the to-be-transmitted data 62 is received as measured by a timer implemented in the relay device 16. In addition, for example, the suborder position of the to-be-transmitted data 62 may be identified based on a timing signal received from the timing generating unit 92.

In the present embodiment, for example, the packet temporary storage unit 102 stores to-be-transmitted data 62 determined by the output necessity determining unit 100 as data to be stored temporarily.

In the present embodiment, for example, the packet output unit 104 outputs to-be-transmitted data 62 determined by the output necessity determining unit 100 as data to be output. Here, for example, the to-be-transmitted data 62 may be output to an upper protocol layer or may be output to the entertainment device 14.

Hereinafter, an exemplary flow of processing of transmission of to-be-transmitted data 62 performed at the HMD 12 according to the present embodiment is explained with reference to the flow chart illustrated in FIG. 8. Note that in this processing example, as illustrated in FIG. 5, transmission of to-be-transmitted data 62 is performed three times in one unit period.

First, the frequency changing unit 82 determines whether or not it is the time to change the frequency (S101). In the process illustrated as S101, for example, it may be determined that it is the time to change the frequency if a timing signal indicating that it is the time to change the frequency is received from the timing generating unit 80.

If it is determined in the process illustrated as S101 that it is not the time to change the frequency (S101: N), the flow returns to the process illustrated as S101.

If it is determined in the process illustrated as S101 that it is the time to change the frequency (S101: Y), the frequency changing unit 82 identifies a frequency to be used newly in communication based on hopping pattern data stored in the hopping pattern data storage unit 78 (S102).

Then, the frequency changing unit 82 changes the frequency used in communication to the frequency identified in the process illustrated as S102 (S103).

Then, the packet transmitting unit 84 identifies three pieces of to-be-transmitted data 62 in ascending order of order positions among pieces of to-be-transmitted data 62 that are stored in the packet buffer 76 (S104).

Then, the packet transmitting unit 84 executes a process of transmitting, to the relay device 16, a packet which is at the earliest order position among the three pieces of to-be-transmitted data 62 that are identified in the process illustrated as S104 (first transmission) (S105). Note that the process illustrated as S105 may be executed at a time at which the first time mentioned above has elapsed after execution of the process illustrated as S103, for example.

Then, the packet transmitting unit 84 executes a process of transmitting, to the relay device 16, a packet which is at the second earliest order position among the three pieces of to-be-transmitted data 62 that are identified in the process illustrated as S104 (second transmission) (S106). Note that the process illustrated as S106 may be executed at a time at which the second time mentioned above has elapsed after execution of the process illustrated as S103, for example.

Then, the packet transmitting unit 84 executes a process of transmitting, to the relay device 16, a packet which is at the last order position among the three pieces of to-be-transmitted data 62 that are identified in the process illustrated as S104 (third transmission) (S107). Note that the process illustrated as S107 may be executed at a time at which the third time mentioned above has elapsed after execution of the process illustrated as S103, for example.

Then, from the packet buffer 76, the packet transmitting unit 84 deletes the packet at the earliest order position among the packets of the three pieces of to-be-transmitted data 62 that are identified in the process illustrated as S104 (S108), and returns to the process illustrated as S101. The packet deleted in the process illustrated as S108 is a packet which is transmitted at the first transmission in the process illustrated as S105 (i.e., a packet for which third transmission has been executed).

Hereinafter, an exemplary flow of processing of reception of to-be-transmitted data 62 performed at the relay device 16 according to the present embodiment is explained with reference to the flow charts illustrated in FIG. 9A to FIG. 9E.

Figure 8:
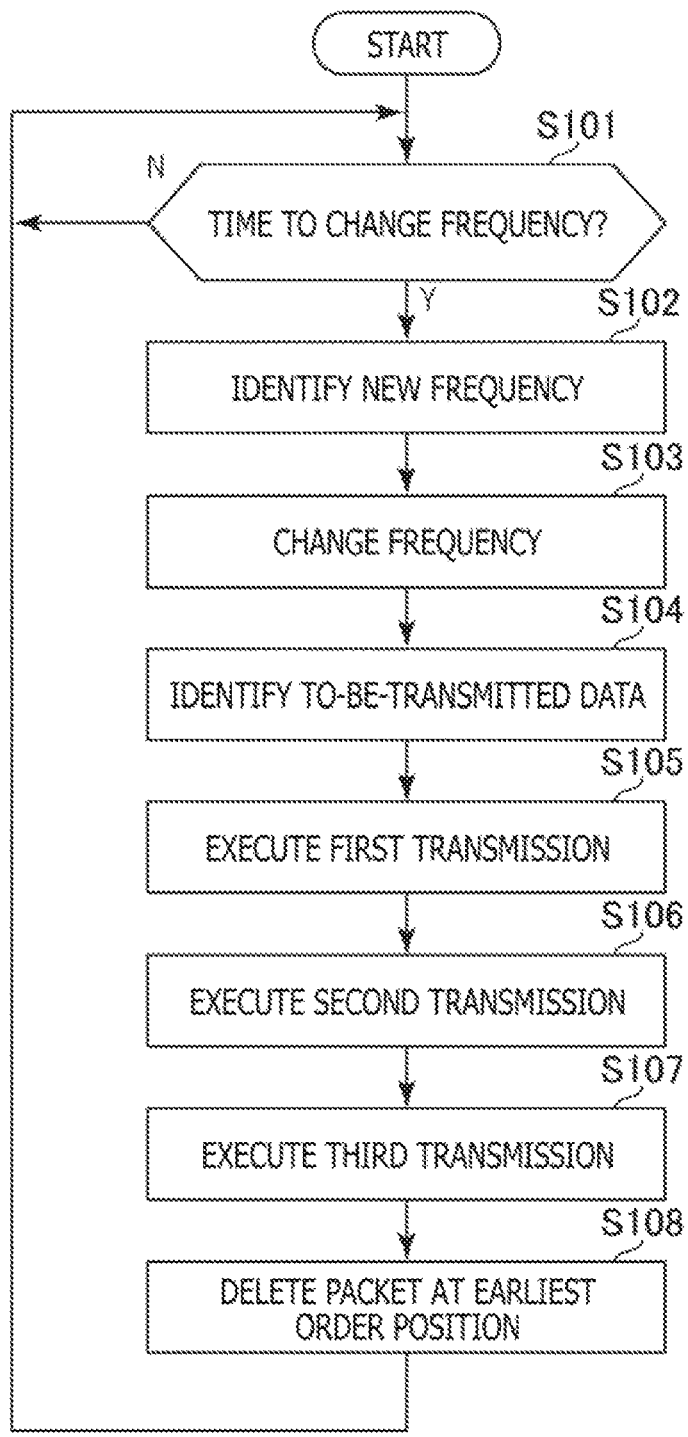
FIG. 8 is a flow chart illustrating an exemplary flow of processing to be performed at the head mounted display according to one embodiment of the present invention.
Figure 9A:
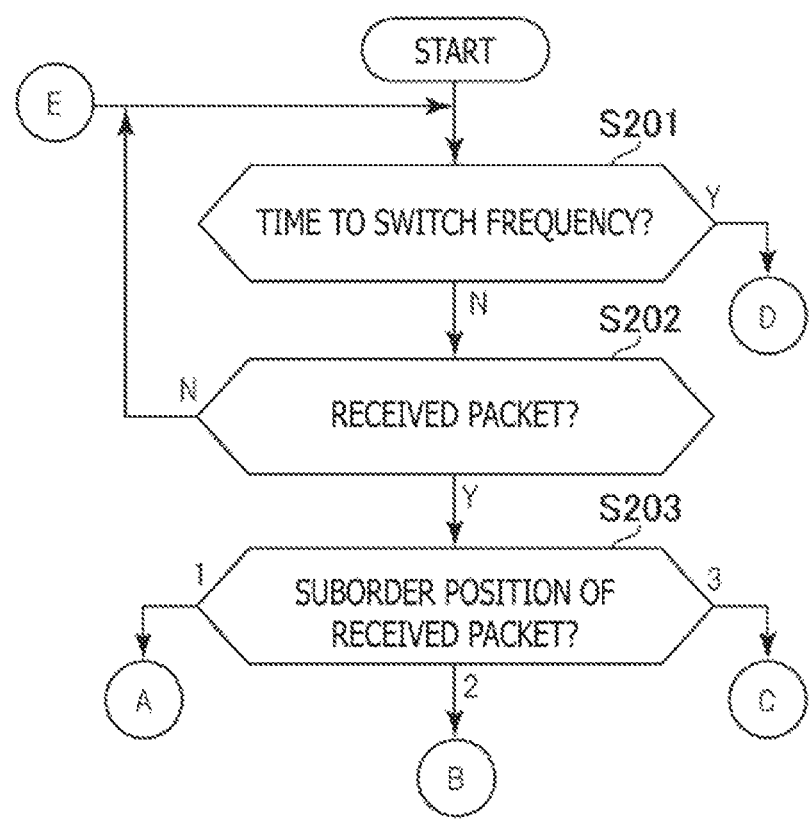
FIG. 9A is a flow chart illustrating an exemplary flow of processing to be performed at the relay device according to one embodiment of the present invention.
Figure 9B:
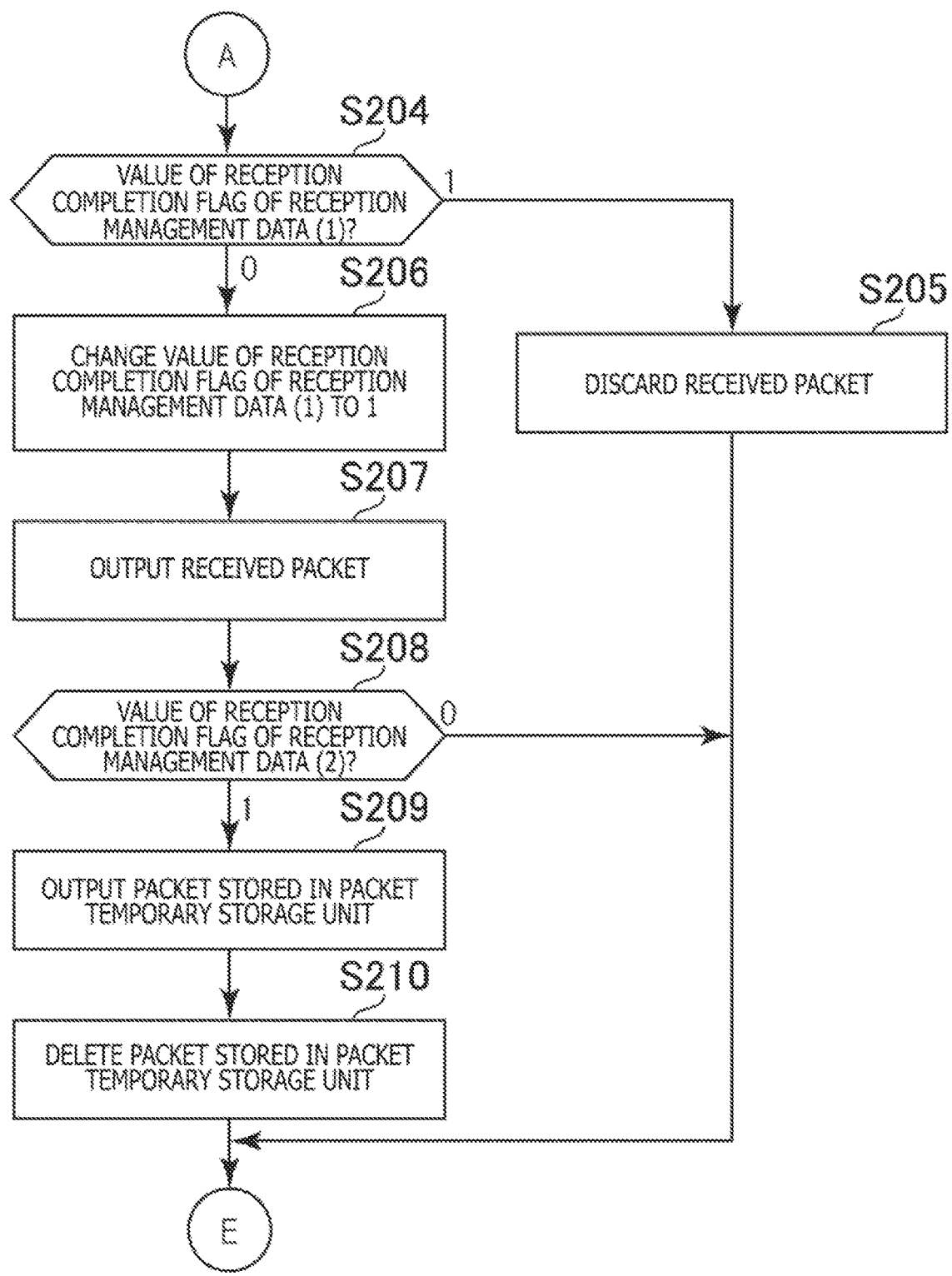
FIG. 9B is a flow chart illustrating an exemplary flow of processing to be performed at the relay device according to one embodiment of the present invention.
Figure 9C:
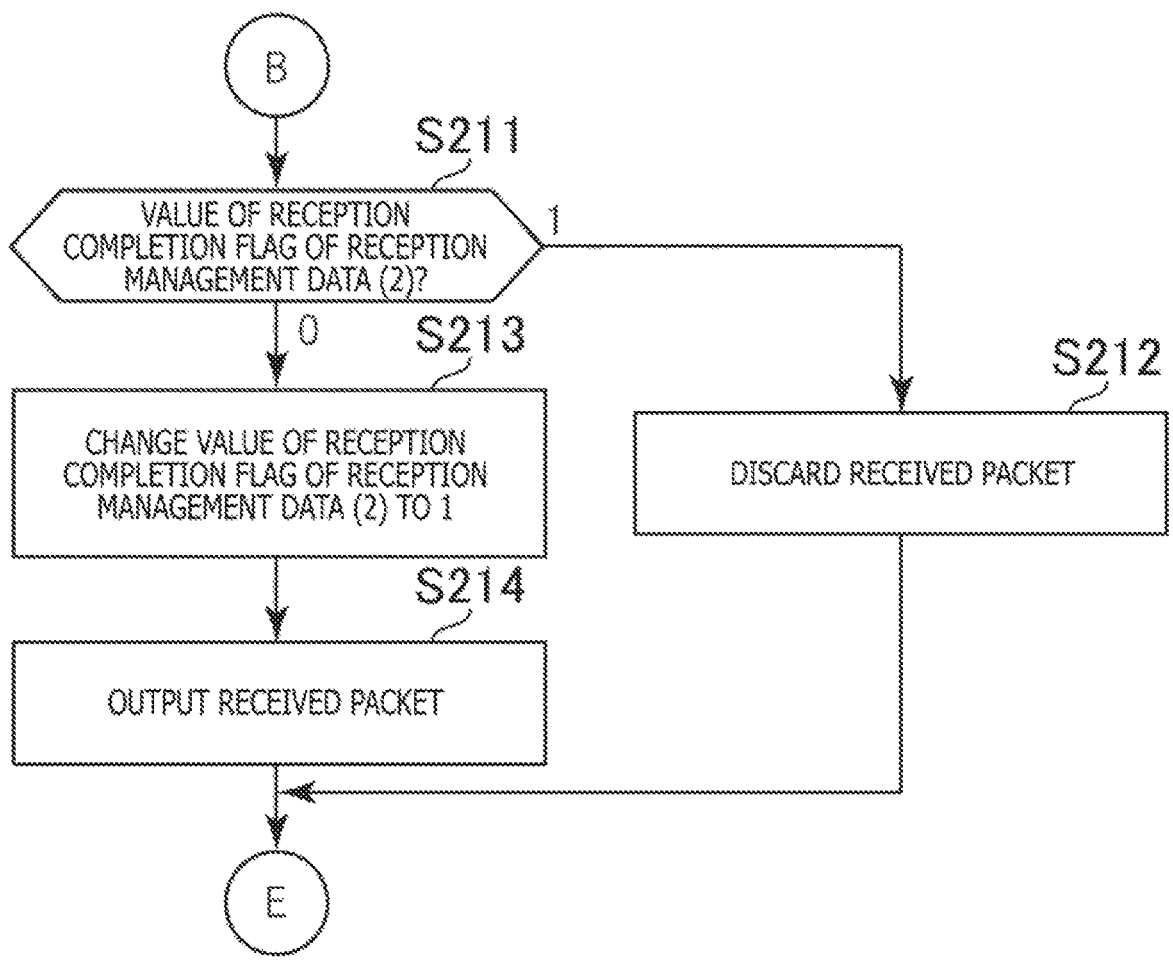
FIG. 9C is a flow chart illustrating an exemplary flow of processing to be performed at the relay device according to one embodiment of the present invention.
Figure 9D:
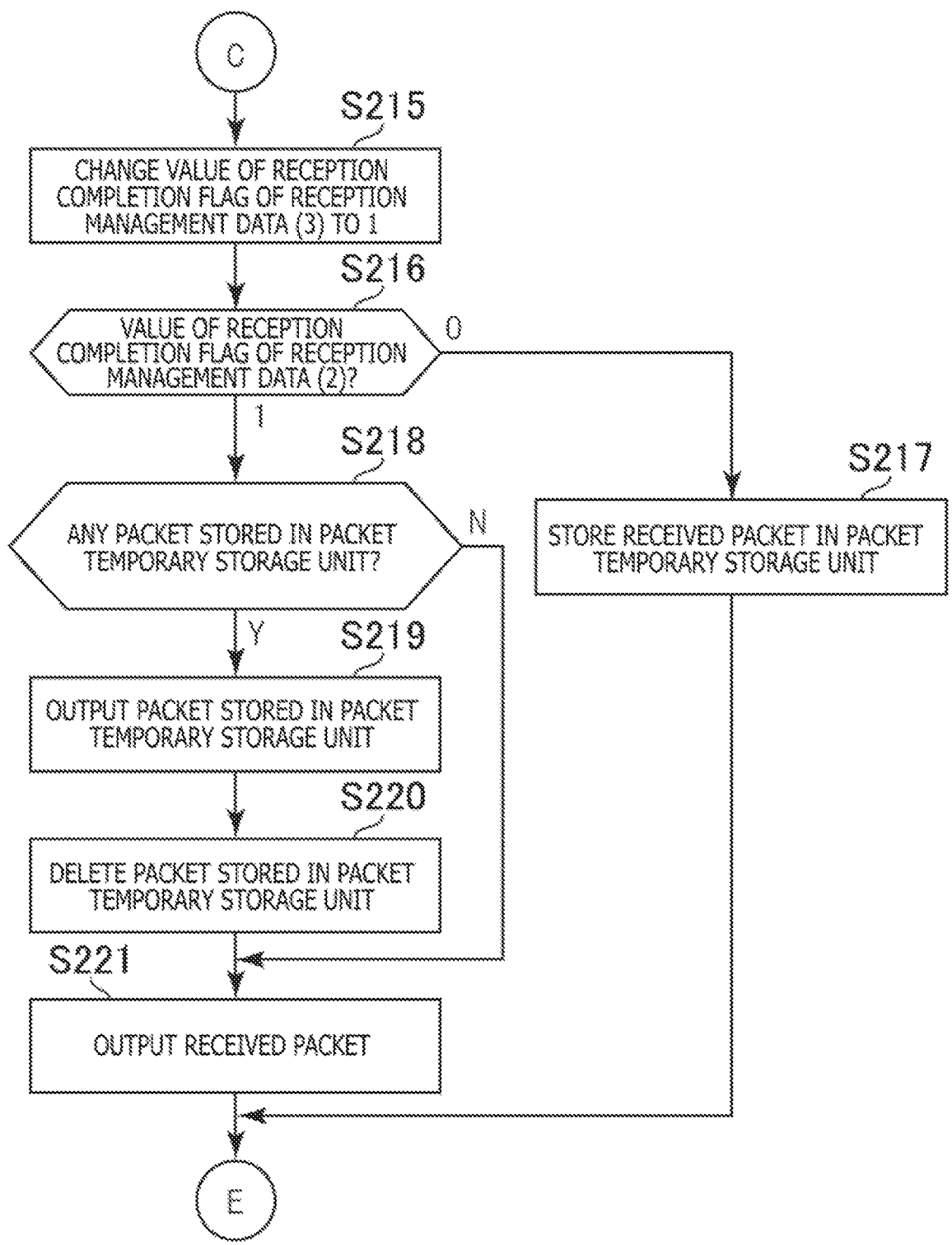
FIG. 9D is a flow chart illustrating an exemplary flow of processing to be performed at the relay device according to one embodiment of the present invention.
Figure 9E:
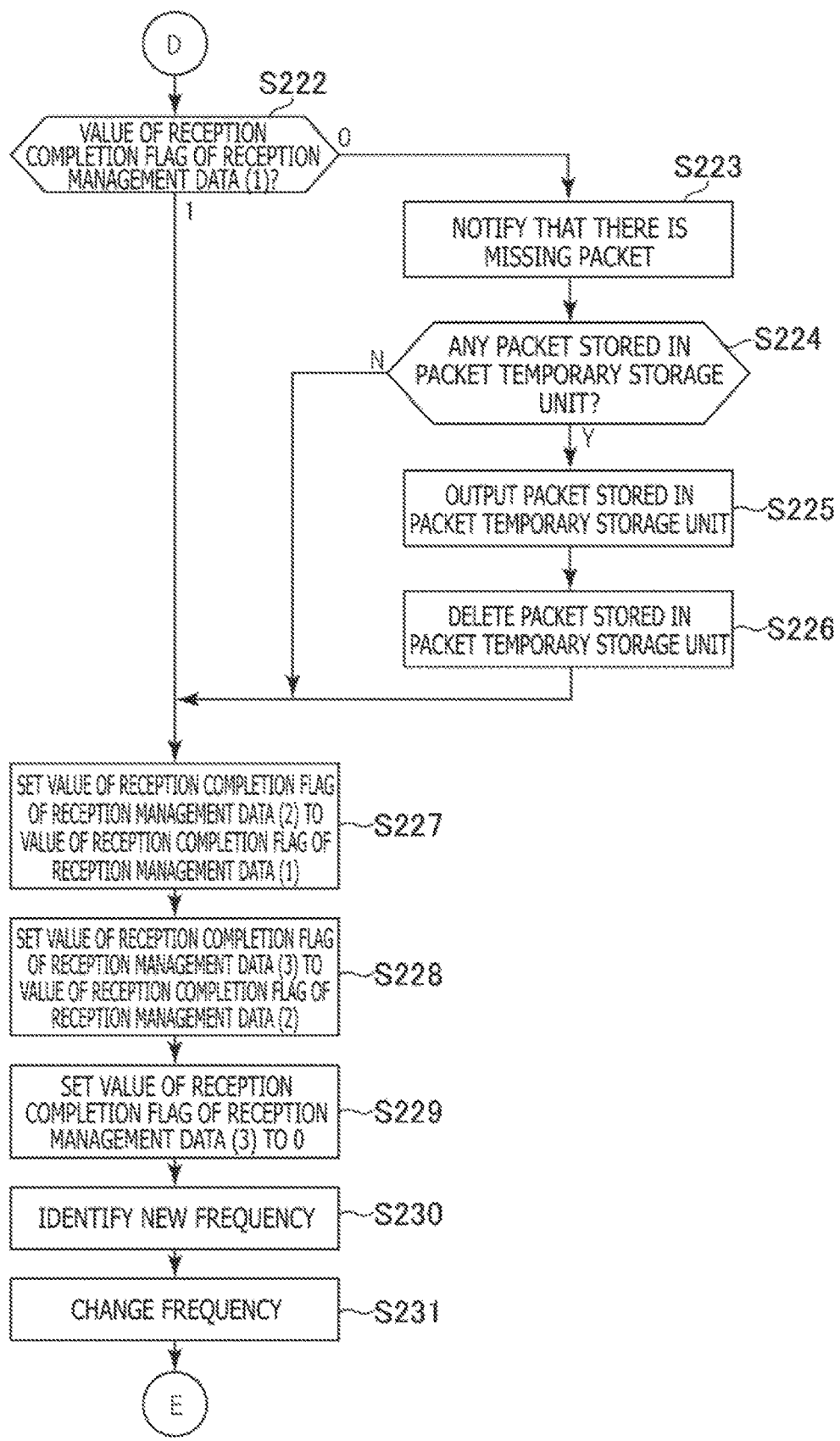
FIG. 9E is a flow chart illustrating an exemplary flow of processing to be performed at the relay device according to one embodiment of the present invention.

The reception processes illustrated in FIG. 9A to FIG. 9E are associated with the transmission process illustrated in FIG. 8. In addition, in the reception processes illustrated in FIG. 9A to FIG. 9E, reception of to-be-transmitted data 62 is performed three times in one unit period as illustrated in FIG. 5. Note that at the start of the processes illustrated in this processing example, all the reception completion flag values included in reception management data stored in the reception management data storage unit 98 are 0.

First, the frequency changing unit 94 determines whether or not it is the time to change the frequency (S201). In the process illustrated as S201, for example, it may be determined that it is the time to change the frequency if a timing signal indicating that it is the time to change the frequency is received from the timing generating unit 92.

If it is determined in the process illustrated as S201 that it is not the time to change the frequency (S201: N), it is checked whether or not the packet receiving unit 96 has received packets of to-be-transmitted data 62 (S202).

If it is found in the process illustrated as S202 that packets have not been received (S202: N), the flow returns to the process illustrated as S201.

If it is found in the process illustrated as the S202 that packets have been received (S202: Y), the output necessity determining unit 100 identifies the suborder position of to-be-transmitted data 62 received by the packet receiving unit 96 (S203).

If the suborder position identified in the process illustrated as S203 is 1, the output necessity determining unit 100 checks the reception completion flag value of the reception management data (1) (S204). If the reception completion flag value is found to be 1 in the process illustrated as S204, the output necessity determining unit 100 discards the packets of the to-be-transmitted data 62 received by the packet receiving unit 96 (S205).

That the reception completion flag value of the reception management data (1) is 1 is equivalent to that the to-be-transmitted data 62 transmitted at the first transmission in the current unit period has been received in a unit period before the current unit period. Because of this, in this case, the to-be-transmitted data 62 transmitted at the first transmission in the current unit period is discarded as mentioned above.

If the reception completion flag value is found to be 0 in the process illustrated as S204, the output necessity determining unit 100 changes the reception completion flag value of the reception management data (1) to 1 (S206). Then, the packet output unit 104 executes a process of outputting the packet of the to-be-transmitted data 62 received by the packet receiving unit 96 (S207). In the output process illustrated as S207, for example, output to an upper protocol layer may be executed, or output to the entertainment device 14 may be executed, as mentioned above.

That the reception completion flag value of the reception management data (1) is 0 is equivalent to that the to-be-transmitted data 62 transmitted at the first transmission in the current unit period has not been received. Because of this, in this case, the process of outputting the to-be-transmitted data 62 transmitted from the HMD 12 at the first transmission in the current unit period is executed as mentioned above.

Then, after the end of the process illustrated as S207, the output necessity determining unit 100 checks the reception completion flag value of the reception management data (2) (S208). If the reception completion flag value is found to be 1 in the process illustrated as S208, the packet output unit 104 executes a process of outputting the packet of the to-be-transmitted data 62 stored in the packet temporary storage unit 102 (S209). In the process illustrated as S209 also, output to an upper protocol layer may be executed, or output to the entertainment device 14 may be executed, as mentioned above.

The process illustrated as S208 is executed if the process of outputting the to-be-transmitted data 62 transmitted at the first transmission is executed in the current unit period. This piece of to-be-transmitted data 62 is data that is transmitted for the third time following transmission at the second transmission in the previous unit period immediately before the current unit period after transmission at the third transmission in the unit period before the previous unit period immediately before the current unit period, and is successfully received at the relay device 16 for the first time.

That the reception completion flag value of the reception management data (2) is 1 in this situation is equivalent to that the to-be-transmitted data 62 transmitted at the second transmission in the current unit period, that is, to-be-transmitted data 62 transmitted at the third transmission in the previous unit period, has been received. Then, the to-be-transmitted data 62 transmitted at the third transmission in the previous unit period is data which is at a latter order position than the to-be-transmitted data 62 transmitted at the first transmission in the current unit period. Because of this, as mentioned below, in this processing example, the to-be-transmitted data 62 transmitted at the third transmission in the previous unit period is stored in the packet temporary storage unit 102. Then, in this processing example, the to-be-transmitted data 62 transmitted at the first transmission in the current unit period which is at an earlier order position than the to-be-transmitted data 62 transmitted at the third transmission in the previous unit period is output in the process illustrated as S207. Then, thereafter, the to-be-transmitted data 62 stored in the packet temporary storage unit 102 in the process illustrated as S209 is output.

In this manner, in this processing example, even if the order positions associated with to-be-transmitted data 62, and the reception order positions of the to-be-transmitted data 62 are reversed, output processes according to the order positions associated with the to-be-transmitted data 62 are executed.

Then, after the process illustrated as S209 is executed, the packet output unit 104 deletes the to-be-transmitted data 62 stored in the packet temporary storage unit 102 (S210).

If the process illustrated as S205 or the process illustrated as S210 is ended, the flow returns to the process illustrated as S201. Also if the reception completion flag value is found to be 0 in the process illustrated as S208, the flow returns to the process illustrated as S201.

If the suborder position identified in the process illustrated as S203 is 2, the output necessity determining unit 100 checks the reception completion flag value of the reception management data (2) (S211). If the reception completion flag value is found to be 1 in the process illustrated as S211, the output necessity determining unit 100 discards the packets of the to-be-transmitted data 62 received by the packet receiving unit 96 (S212).

That the reception completion flag value of the reception management data (2) is 1 is equivalent to that the to-be-transmitted data 62 transmitted at the second transmission in the current unit period has been received in a unit period before the current unit period. Because of this, in this case, the to-be-transmitted data 62 transmitted at the second transmission in the current unit period is discarded as mentioned above.

If the reception completion flag value is found to be 0 in the process illustrated as S211, the output necessity determining unit 100 changes the reception completion flag value of the reception management data (2) to 1 (S213). Then, the packet output unit 104 executes a process of outputting the packet of the to-be-transmitted data 62 received by the packet receiving unit 96 (S214). In the output process illustrated as S214 also, for example, output to an upper protocol layer may be executed, or output to the entertainment device 14 may be executed, as mentioned above.

That the reception completion flag value of the reception management data (2) is 0 is equivalent to that the to-be-transmitted data 62 transmitted at the second transmission in the current unit period has not been received. Because of this, in this case, the process of outputting the to-be-transmitted data 62 transmitted at the second transmission in the current unit period is executed as mentioned above.

If the process illustrated as S212 or the process illustrated as S214 is ended, the flow returns to the process illustrated as S201.

If the suborder position identified in the process illustrated as S203 is 3, the output necessity determining unit 100 changes the reception completion flag value of the reception management data (3) to 1 (S215). Then, the output necessity determining unit 100 checks the reception completion flag value of the reception management data (2) (S216). If the reception completion flag value is found to be 0 in the process illustrated as S216, the output necessity determining unit 100 causes the packet of the to-be-transmitted data 62 received by the packet receiving unit 96 to be stored in the packet temporary storage unit 102 (S217).

That the reception completion flag value of the reception management data (2) is 0 is equivalent to that to-be-transmitted data 62 which is at the order position immediately before the to-be-transmitted data 62 transmitted at the third transmission in the current unit period has not been received. In this case, the to-be-transmitted data 62 transmitted at the third transmission in the current unit period is stored in the packet temporary storage unit 102 as mentioned above.

In this manner, when the packet receiving unit 96 received second data which has a larger order position number than the order position number of first data before reception of the first data, the packet temporary storage unit 102 may store the second data. Then, when the packet receiving unit 96 received the first data after the reception of the second data, the packet output unit 104 may output the second data stored in the packet temporary storage unit 102 after the received first data is output.

If the reception completion flag value is found to be 1 in the process illustrated as S216, the packet output unit 104 checks whether or not there is a packet of to-be-transmitted data 62 stored in the packet temporary storage unit 102 (S218). If it is found that there is a packet in the process illustrated as S218 (S218: Y), the packet output unit 104 executes a process of outputting the packet of the to-be-transmitted data 62 stored in the packet temporary storage unit 102 (S219). In the process illustrated as S219 also, output to an upper protocol layer may be executed, or output to the entertainment device 14 may be executed, as mentioned above.

Then, after the process illustrated as S219 is executed, the packet output unit 104 deletes the packet of the to-be-transmitted data 62 stored in the packet temporary storage unit 102 (S220).

If the process illustrated as S220 is ended, the packet output unit 104 executes a process of outputting the to-be-transmitted data 62 received by the packet receiving unit 96 (S221). Also if it is found that there is not a packet of to-be-transmitted data 62 stored in the packet temporary storage unit 102 in the process illustrated as S218 (S218: N), the process of outputting the to-be-transmitted data 62 received by the packet receiving unit 96 is executed (S221). In the process illustrated as S221 also, output to an upper protocol layer may be executed, or output to the entertainment device 14 may be executed, as mentioned above.

If the reception completion flag value of the reception management data (2) is 1, this means that to-be-transmitted data 62 which is at the order position immediately before the to-be-transmitted data 62 transmitted at the third transmission in the current unit period has been received. For example, the to-be-transmitted data 62(3) is transmitted at the third transmission in the current unit period. In this case, if the reception completion flag value of the reception management data (2) is 1, this means that the to-be-transmitted data 62(2) has been received. Here, the to-be-transmitted data 62(2) is stored in the packet temporary storage unit 102 in some cases. In this case, after the process of outputting the to-be-transmitted data 62(2) is executed in the process illustrated as S219, the process of outputting the to-be-transmitted data 62(3) is executed in the process illustrated as S221. In addition, the to-be-transmitted data 62(2) is not stored in the packet temporary storage unit 102 in some cases. In this case, the process of outputting the to-be-transmitted data 62(2) has been ended. Because of this, in this case, even if the process of outputting the to-be-transmitted data 62(3) is executed, it is never the case that the order of execution is reversed between the output processes of the to-be-transmitted data 62(3) and the to-be-transmitted data 62(2). In this manner, in this processing example, the process of outputting to-be-transmitted data 62 received by the packet receiving unit 96 is executed in the process illustrated as S221.

If the process illustrated as S217 or the process illustrated as S221 is ended, the flow returns to the process illustrated as S201.

It is determined in the process illustrated as S201 that it is the time to change the frequency (S201: Y). In this case, the output necessity determining unit 100 checks the reception completion flag value of the reception management data (1) (S222). If the reception completion flag value is found to be 0, the packet output unit 104 notifies that there is a missing packet (S223). The notification illustrated in S223 may be output to an upper protocol layer or may be output to the entertainment device 14.

If the process illustrated as S223 is ended, the packet output unit 104 checks whether or not there is a packet of to-be-transmitted data 62 stored in the packet temporary storage unit 102 (S224). If it is found that there is a packet in the process illustrated as S224 (S224: Y), the packet output unit 104 executes a process of outputting the packet of the to-be-transmitted data 62 stored in the packet temporary storage unit 102 (S225). In the process illustrated as S225 also, output to an upper protocol layer may be executed, or output to the entertainment device 14 may be executed, as mentioned above.

Then, after the process illustrated as S225 is executed, the packet output unit 104 deletes the to-be-transmitted data 62 stored in the packet temporary storage unit 102 (S226).

If the reception completion flag value is found to be 1 in the process illustrated as S222, if the process illustrated as S226 has ended, or if it is found in the process illustrated as S224 that there is not a packet of to-be-transmitted data 62 stored in the packet temporary storage unit 102 (S224: N), the output necessity determining unit 100 sets the reception completion flag value of the reception management data (2) to the reception completion flag value of the reception management data (1) (S227). Then, the output necessity determining unit 100 sets the reception completion flag value of the reception management data (3) to the reception completion flag value of the reception management data (2) (S228). Then, the output necessity determining unit 100 sets the reception completion flag value of the reception management data (3) to 0 (S229).

Then, based on hopping pattern data stored in the hopping pattern data storage unit 90, the frequency changing unit 94 identifies a frequency to be newly used in communication (S230).

Then, the frequency changing unit 94 changes the frequency to be used in communication to the frequency identified in the process illustrated as S230 (S231), and the flow returns to the process illustrated as S201.

In the processes illustrated in FIG. 9A to FIG. 9E, as mentioned above, even if to-be-transmitted data 62 does not indicate the order, it is possible to detect that the reception order position of the to-be-transmitted data 62 is different from the order position of the to-be-transmitted data 62. For example, even if headers 64 of to-be-transmitted data 62 do not include order position numbers, it is possible to detect that the reception order position of the to-be-transmitted data 62 is different from the order position of the to-be-transmitted data 62. Then, it is possible to make the to-be-transmitted data 62 sequentially output according to the order positions of the to-be-transmitted data 62. Note that when it is detected that the reception order position of the to-be-transmitted data 62 is different from the order position of the to-be-transmitted data 62, the packet output unit 104 may issue a notification indicating the difference.

Although in the example explained above, transmission of to-be-transmitted data 62 is performed three times in one unit period, the number of times of execution of transmission of to-be-transmitted data 62 in one unit period may be not three. In addition, although in the example explained above, each piece of to-be-transmitted data 62 is transmitted three times at different channels, the number of times of transmission of each piece of to-be-transmitted data 62 at different channels may be not three.

In the situation explained below, transmission of to-be-transmitted data 62 is executed m times in one unit period, and each piece of to-be-transmitted data 62 is transmitted at mutually different channels m times (m is an integer equal to or larger than one). In this case, first transmission to m-th transmission are performed in one unit period.

Figure 10A:
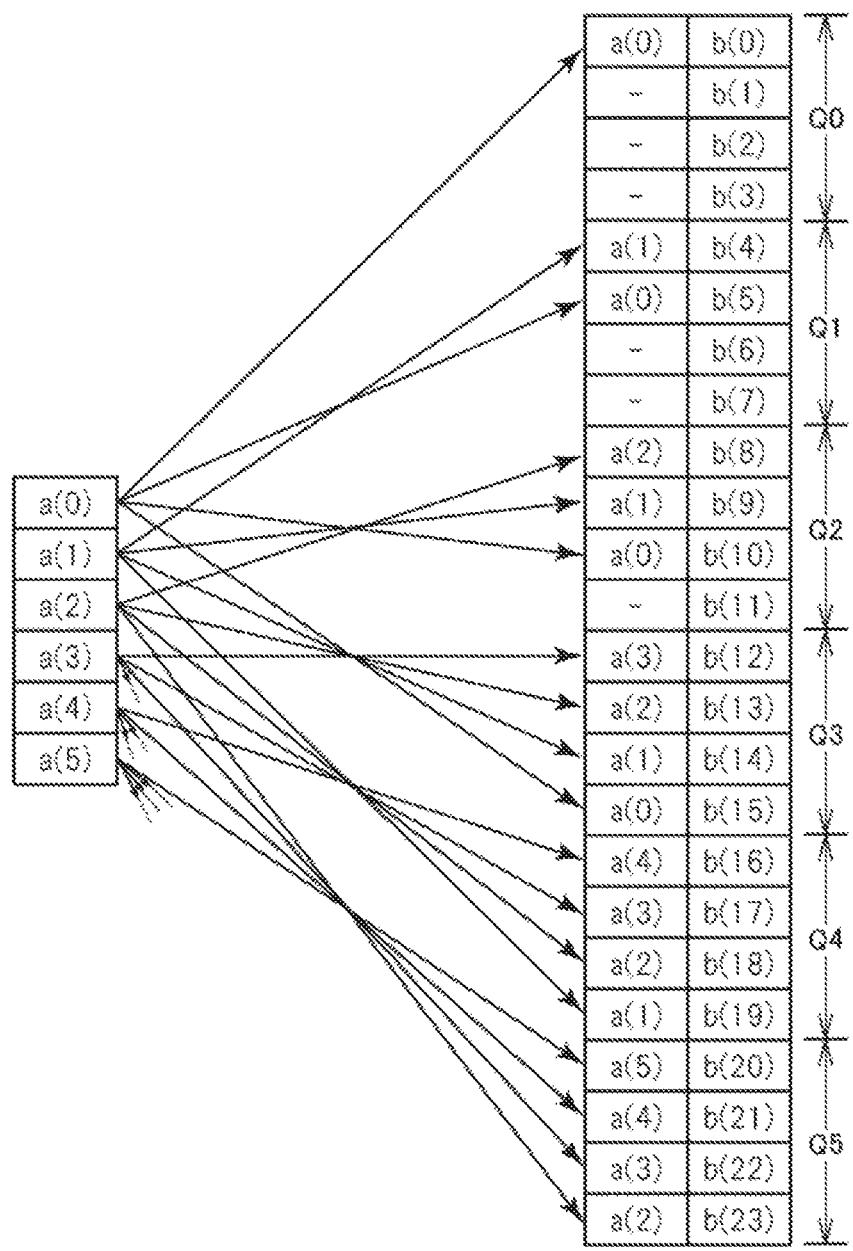
FIG. 10A is a figure schematically illustrating an exemplary situation where to-be-transmitted data is transmitted in one unit period in descending order of order position numbers.

FIG. 10A schematically illustrates an exemplary situation where pieces of to-be-transmitted data 62 are transmitted four times in one unit period in descending order of order position numbers. In addition, FIG. 10B schematically illustrates an exemplary situation where pieces of to-be-transmitted data 62 are transmitted four times in one unit period in ascending order of order position numbers.

Figure 10B:
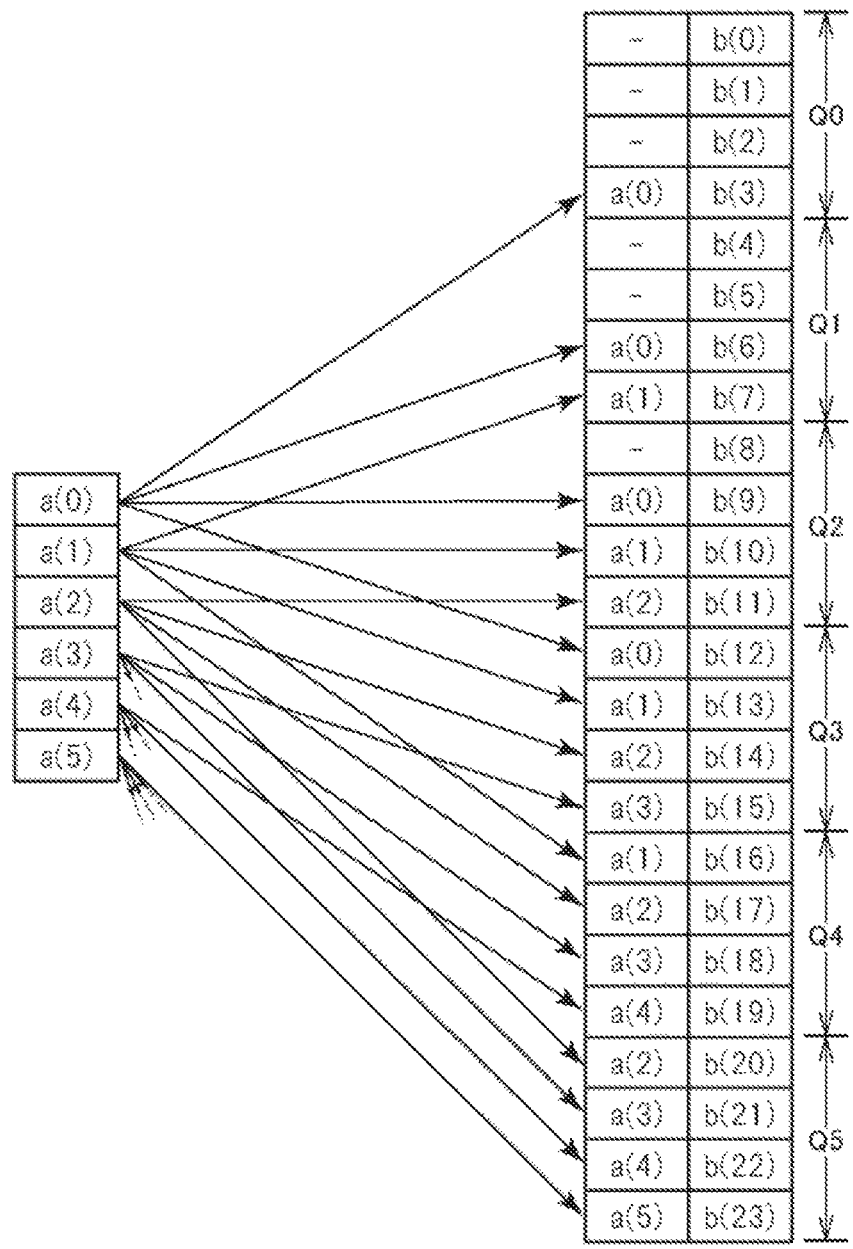
FIG. 10B is a figure schematically illustrating an exemplary situation where to-be-transmitted data is transmitted in one unit period in ascending order of order position numbers.

In FIG. 10A and FIG. 10B, to-be-transmitted data 62(n) is expressed as a(n) (n=0, 1, 2, . . . ).

Then, transmission order positions of to-be-transmitted data 62 are expressed as b(l) (l=0, 1, 2, . . . ). Unlike suborders mentioned above, transmission order positions expressed by b(l) refer to positions that are set in terms of the entire to-be-transmitted data 62 transmitted in a plurality of unit periods.

FIG. 10A and FIG. 10B illustrate unit periods Q0 to Q5. Here, first transmission, second transmission, third transmission, and fourth transmission in the unit period Q0 are equivalent to b(0), b(1), b(2), and b(3), respectively. Similarly, first transmission, second transmission, third transmission, and fourth transmission in the unit period Q1 are equivalent to b(4), b(5), b(6), and b(7), respectively. First transmission, second transmission, third transmission, and fourth transmission in the unit period Q2 are equivalent to b(8), b(9), b(10), and b(11), respectively. First transmission, second transmission, third transmission, and fourth transmission in the unit period Q3 are equivalent to b(12), b(13), b(14), and b(15), respectively. First transmission, second transmission, third transmission, and fourth transmission in the unit period Q4 are equivalent to b(16), b(17), b(18), and b(19), respectively. First transmission, second transmission, third transmission, and fourth transmission in the unit period Q5 are equivalent to b(20), b(21), b(22), and b(23), respectively.

If there is a situation as illustrated in FIG. 10A where to-be-transmitted data 62 is transmitted in descending order of order position numbers in one unit period, to-be-transmitted data 62 expressed as a(n) is transmitted at transmission order positions $b(m(n+k)+k)$ (k=0, 1, . . . , m), for example. If the value of m is 4, as illustrated in FIG. 10A, the to-be-transmitted data 62 expressed as a(0) is transmitted at the transmission order positions b(0), b(5), b(10), and b(15), for example. In addition, in this case, the to-be-transmitted data 62 expressed as a(1) is transmitted at the transmission order positions b(4), b(9), b(14), and b(19), for example. In addition, in this case, the to-be-transmitted data 62 expressed as a(2) is transmitted at the transmission order positions b(8), b(13), b(18), and b(23), for example.

In addition, if there is a situation as illustrated in FIG. 10B where to-be-transmitted data 62 is transmitted in ascending order of order position numbers in one unit period, to-be-transmitted data 62 expressed as a(n) is transmitted at transmission order positions $b(mn+(m-1)(k+1))$ (k=0, 1, . . . , m), for example. If the value of m is 4, as illustrated in FIG. 10B, the to-be-transmitted data 62 expressed as a(0) is transmitted at the transmission order positions b(3), b(9), b(12), and b(17), for example. In addition, in this case, the to-be-transmitted data 62 expressed as a(1) is transmitted at the transmission order positions b(7), b(10), b(13), and b(16), for example. In addition, in this case, the to-be-transmitted data 62 expressed as a(2) is transmitted at the transmission order positions b(11), b(14), b(17), and b(20), for example.

Then, in the examples illustrated in FIG. 10A and FIG. 10B, if the relay device 16 received to-be-transmitted data 62 transmitted at a transmission order position b(1), it can identify the order position number associated with the to-be-transmitted data 62.

In the example of FIG. 10A, $a(1-(m+1)(1\% m)/m)$ is identified as to-be-transmitted data 62 associated with b(1). Note that % mentioned above represents a modulo. In the example of FIG. 10A, the value of m is 4 as mentioned above. In this case, if to-be-transmitted data 62 transmitted at the transmission order position b(15) is received, the to-be-transmitted data 62 is identified as a(0). Similarly, if to-be-transmitted data 62 transmitted at the transmission order position b(16) is received, the to-be-transmitted data 62 is identified as a(4).

In the example of FIG. 10B, $a((1+(m-1)(1\% m)-m(m-1))/m)$ is identified as to-be-transmitted data 62 associated with b(1). In the example of FIG. 10B also, the value of m is 4 as mentioned above. In this case, if to-be-transmitted data 62 transmitted at the transmission order position b(15) is received, the to-be-transmitted data 62 is identified as a(3). Similarly, if to-be-transmitted data 62 transmitted at the transmission order position b(16) is received, the to-be-transmitted data 62 is identified as a(1).

In addition, in the examples illustrated in FIG. 10A and FIG. 10B, the relay device 16 can identify transmission order positions which are before a transmission order position b(1) and at which pieces of to-be-transmitted data 62 identical to a piece of to-be-transmitted data 62 transmitted at b(1) are transmitted. Hereinafter, packets at transmission order positions which are before a transmission order position b(1) and at which pieces of to-be-transmitted data 62 identical to a piece of to-be-transmitted data 62 transmitted at b(1) are transmitted are called corresponding packets of a packet of the to-be-transmitted data 62 transmitted at the transmission order position b(1).

In the example of FIG. 10A, each of packets at k transmission order positions expressed by $b(1-j(m+1))$ (j=1, 2, . . . , k) is identified as a corresponding packet of a packet of to-be-transmitted data 62 transmitted at a transmission order position b(1). Note that in the example of FIG. 10A, the value k is a value calculated by using a calculation formula with (1% m).

In the example of FIG. 10B, each of packets at k transmission order positions expressed by b(1−j(m+1)) (j=1, 2, ..., k) is identified as a corresponding packet of a packet of to-be-transmitted data 62 transmitted at a transmission order position b(1). Note that in the example of FIG. 10B, the value k is a value calculated by using a calculation formula with (m−(1% m)−1).

Figure 11:
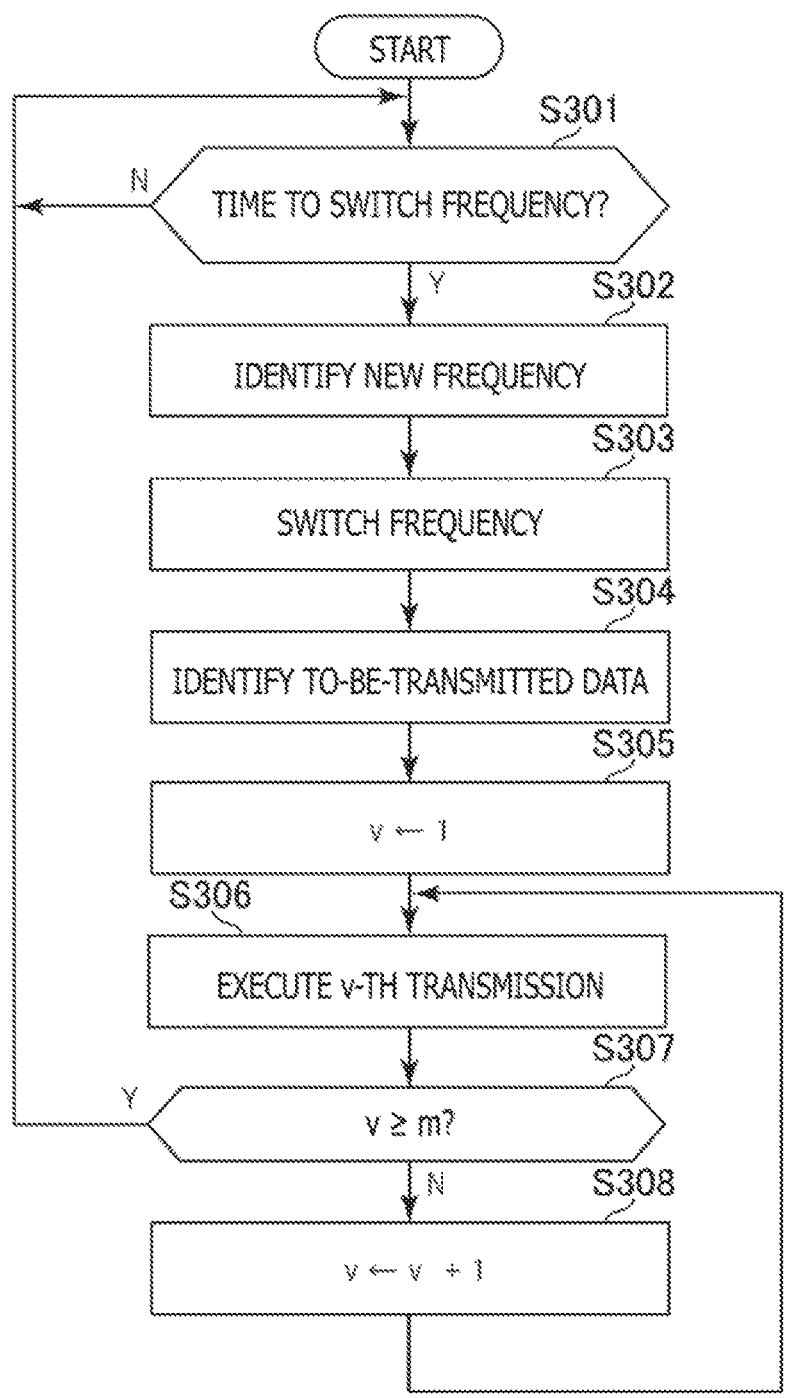
FIG. 11 is a flow chart illustrating an exemplary flow of processing to be performed at the head mounted display according to one embodiment of the present invention.

Hereinafter, an exemplary flow of processing of transmission of to-be-transmitted data 62 associated with FIG. 10A and FIG. 10B and performed at the HMD 12 according to the present embodiment is explained with reference to the flow chart illustrated in FIG. 11. Note that in this processing example, as illustrated in FIG. 10A and FIG. 10B, transmission of to-be-transmitted data 62 is performed m times in one unit period.

First, the frequency changing unit 82 determines whether or not it is the time to change the frequency (S301).

If it is determined in the process illustrated as S301 that it is not the time to change the frequency (S301: N), the flow returns to the process illustrated as S301.

If it is determined in the process illustrated as S301 that it is the time to change the frequency (S301: Y), the frequency changing unit 82 identifies a frequency to be used newly in communication based on hopping pattern data stored in the hopping pattern data storage unit 78 (S302).

Then, the frequency changing unit 82 changes the frequency used in communication to the frequency identified in the process illustrated as S302 (S303).

Then, the packet transmitting unit 84 identifies m pieces of to-be-transmitted data 62 in ascending order of order positions among pieces of to-be-transmitted data 62 that are stored in the packet buffer 76 (S304).

Then, the packet transmitting unit 84 sets the value of the variable v to 1 (S305). Then, the packet transmitting unit 84 executes a process of transmitting, to the relay device 16, a packet which is v-th from the beginning of the order (or v-th from the end of the order) among the m pieces of to-be-transmitted data 62 that are identified in the process illustrated as S304 (v-th transmission) (S306).

Then, the packet transmitting unit 84 checks whether or not the value of the variable v is equal to or larger than the value m (S307). If the value of the variable v is found to be smaller than the value m in the process illustrated as S307 (S307: N), the packet transmitting unit 84 increments the value of the variable v by 1 (S308), and the flow returns to the process illustrated as S306.

If the value of the variable v is found to be equal to or larger than the value m in the process illustrated as S307 (S307: Y), the flow returns to the process illustrated as S301.

Figure 12:
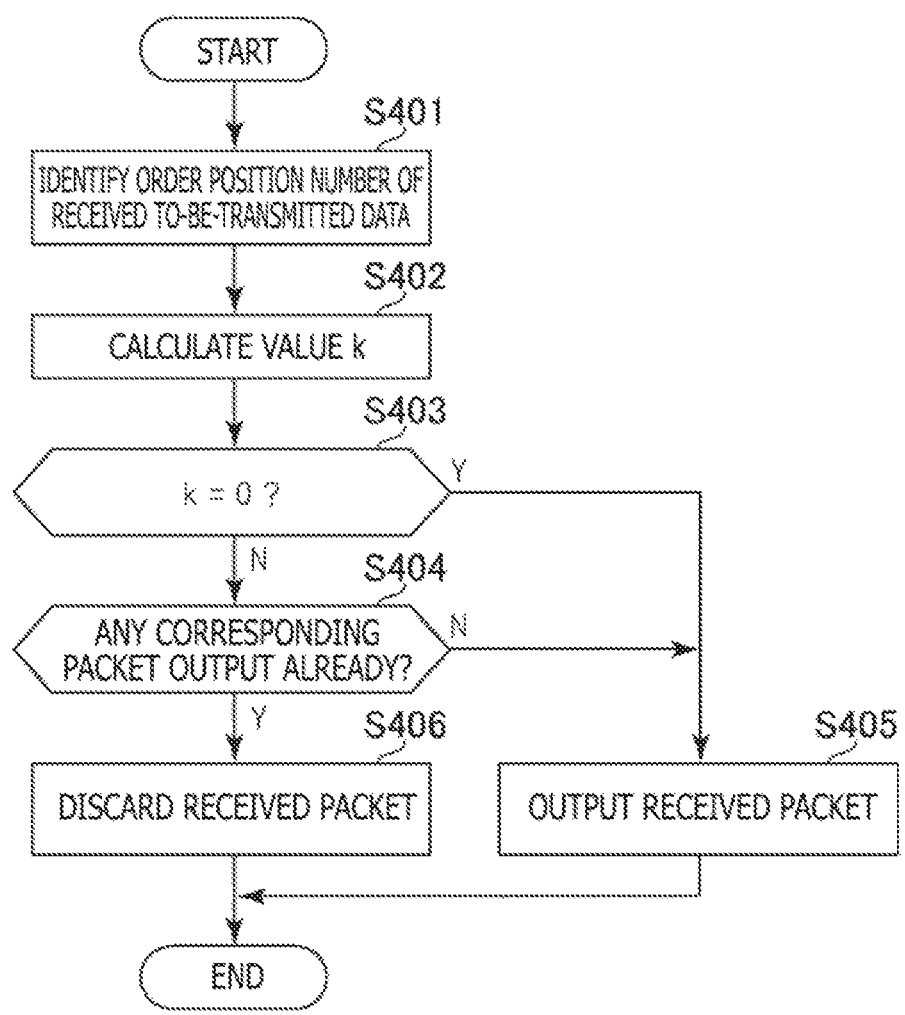
FIG. 12 is a flow chart illustrating an exemplary flow of processing to be performed at the relay device according to one embodiment of the present invention.

Hereinafter, an exemplary flow of processing of output associated with FIG. 10A and FIG. 10B and performed at the relay device 16 according to the present embodiment upon reception of to-be-transmitted data 62 is explained with reference to the flow chart illustrated in FIG. 12.

Note that in this processing example, the output necessity determining unit 100 can identify transmission order positions b(1) of received packets based on times at which they are received, for example. In addition, in this processing example, packets of to-be-transmitted data 62 associated with b(1) are received.

First, the output necessity determining unit 100 identifies the order position number of to-be-transmitted data 62 received by the packet receiving unit 96 (S401).

Then, the output necessity determining unit 100 calculates the value k mentioned above, based on the order position number identified in the process illustrated as S401 (S402).

Then, the output necessity determining unit 100 checks whether or not the value k calculated in the process illustrated as S402 is 0 (S403).

If the value k is found to be not 0 in the process illustrated as S403 (S403: N), the output necessity determining unit 100 checks whether or not any of corresponding packets of a packet of the to-be-transmitted data 62 received by the packet receiving unit 96 has already been output (S404).

If the corresponding packets are found to have not been output at all yet in the process illustrated as S404 (S404: N), the packet output unit 104 executes a process of outputting the packet of the received to-be-transmitted data 62 (S405). Then, the processes illustrated in this processing example are ended.

Also if the value k is found to be 0 in the process illustrated as S403 (S403: Y), the packet output unit 104 executes a process of outputting the packet of the received to-be-transmitted data 62 (S405). Then, the processes illustrated in this processing example are ended.

That the value k is found to be 0 in the process illustrated as S403 is equivalent to that the packet of the received to-be-transmitted data 62 is an initially transmitted packet. Because of this, in this case, a process of outputting the packet of the received to-be-transmitted data 62 is executed.

In the process illustrated as S405, for example, the packet of the received to-be-transmitted data 62 may be output to an upper protocol layer or may be output to the entertainment device 14.

If any one of the corresponding packets is found to have already been output in the process illustrated as S404 (S404: Y), the output necessity determining unit 100 discards the packet of the received to-be-transmitted data 62 (S406). Then, the processes illustrated in this processing example are ended.

Note that the present invention is not limited to the embodiment mentioned above.

For example, one piece of to-be-transmitted data 62 may be transmitted multiple times in one unit period. For example, in one unit period, one piece of to-be-transmitted data 62 may be transmitted, and another piece of to-be-transmitted data 62 may be transmitted twice.

In addition, for example, the present invention can be generally applied to situations where to-be-transmitted data 62 is transmitted wirelessly from a transmitting device to a receiving device. For example, the present invention may be applied to a situation where data indicating manipulation input to the controller 22 is transmitted from the controller 22 to the entertainment device 14. In this case, the functions implemented in the HMD 12 in the embodiment mentioned above and illustrated in FIG. 6A are implemented in the controller 22, and the functions implemented in the relay device 16 in the embodiment mentioned above and illustrated in FIG. 6B are implemented in the entertainment device 14.

In addition, specific character strings or numerical values explained above, and specific character strings or numerical values in the figures are illustrated as examples, and these character strings or numerical values are not the sole examples.

The invention claimed is:

1. A transmitting device that executes, in each of a plurality of periods, data transmission at a frequency associated with each of the periods, the transmitting device comprising:
   an acquiring unit that acquires to-be-transmitted data, wherein the to-be-transmitted data includes first data and second data; and a transmitting unit that:
- transmits the first data and the second data at a first frequency in a first time period; and
- transmits the first data at a second frequency in a second time period in a second time period; and
- transmits the first data at a third frequency in a third time period;
- wherein the first frequency, the second frequency, and the third frequency are different frequencies, and
- wherein the first time period, the second time period, and the third time period are consecutive time periods.

2. The transmitting device according to claim 1, wherein
wherein the first frequency, the second frequency, and the third frequency are chosen according to a frequency hopping pattern.

3. The transmitting device according to claim 1,
wherein the first data is transmitted at an end of the first time period, and
wherein the first data is transmitted at a beginning of the third time period.

4. The transmitting device according to claim 1,
wherein the first data is transmitted in a middle of the second time period.

5. A transmission method executing, in each of a plurality of periods, data transmission at a frequency associated with each of the periods, comprising:
- acquiring to-be-transmitted data,
- wherein the to-be-transmitted data includes first data and second data;
- transmitting the first data and the second data at a first frequency in a first time period; and
- transmitting the first data at a second frequency in a second time period in a second time period; and
- transmitting the first data at a third frequency in a third time period;
- wherein the first frequency, the second frequency, and the third frequency are different frequencies, and
- wherein the first time period, the second time period, and the third time period are consecutive time periods.

6. A non-transitory computer readable medium having stored thereon a program for a computer configured to execute, in each of a plurality of periods, data transmission at a frequency associated with each of the periods, the program comprising:
- acquiring to-be-transmitted data;
- wherein the to-be-transmitted data includes first data and second data;
- transmitting the first data and the second data at a first frequency in a first time period; and
- transmitting the first data at a second frequency in a second time period in a second time period; and
- transmitting the first data at a third frequency in a third time period;
- wherein the first frequency, the second frequency, and the third frequency are different frequencies, and
- wherein the first time period, the second time period, and the third time period are consecutive time periods.

* * * * *